US012259104B2

(12) United States Patent
Ichikawa et al.

(10) Patent No.: US 12,259,104 B2
(45) Date of Patent: Mar. 25, 2025

(54) AUTOMOTIVE LAMP

(71) Applicant: KOITO MANUFACTURING CO., LTD., Tokyo (JP)

(72) Inventors: Tomoyuki Ichikawa, Shizuoka (JP); Shoji Fujita, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 16 days.

(21) Appl. No.: 18/470,484

(22) Filed: Sep. 20, 2023

(65) Prior Publication Data

US 2024/0003512 A1 Jan. 4, 2024

Related U.S. Application Data

(63) Continuation of application No. PCT/JP2022/014641, filed on Mar. 25, 2022.

(30) Foreign Application Priority Data

Mar. 26, 2021 (JP) ................................ 2021-053891

(51) Int. Cl.
*F21S 41/663* (2018.01)
*F21S 41/255* (2018.01)
(Continued)

(52) U.S. Cl.
CPC ........... *F21S 41/663* (2018.01); *F21S 41/255* (2018.01); *F21S 41/33* (2018.01); *F21W 2102/155* (2018.01)

(58) Field of Classification Search
CPC ....... F21S 41/143–663; F21V 5/00–04; F21W 2102/135–155; F21Y 2115/10–30
See application file for complete search history.

(56) References Cited

U.S. PATENT DOCUMENTS

2003/0103358 A1 6/2003 Tatsukawa et al.
2005/0152153 A1 7/2005 Amano
(Continued)

FOREIGN PATENT DOCUMENTS

DE 102016107233 A1 10/2016
EP 2351963 A1 8/2011
(Continued)

OTHER PUBLICATIONS

Extended European Search Report mailed on Nov. 23, 2023, by the European Patent Office for European Patent Application No. EP22775854.7. (52 pages).

(Continued)

*Primary Examiner* — Jason M Han
(74) *Attorney, Agent, or Firm* — BUCHANAN, INGERSOLL & ROONEY PC

(57) ABSTRACT

An automotive lamp includes a first lamp unit, a second lamp unit, and a third lamp unit. The first lamp unit illuminates a first region having its longitudinal direction in the horizontal direction and having its upper edge defining a horizontal cutoff line in the low-beam mode and the high-beam mode. The second lamp unit illuminates a second region having its longitudinal direction in an oblique direction inclined with respect to the horizontal direction and having its upper edge defining an oblique cutoff line in the low-beam mode and the high-beam mode. The third lamp unit illuminates a third region having its longitudinal direction in an oblique direction inclined with respect to the horizontal direction and having its lower edge parallel to the oblique cutoff line.

11 Claims, 16 Drawing Sheets

(51) Int. Cl.

| | |
|---|---|
| ***F21S 41/33*** | (2018.01) |
| ***F21W 102/155*** | (2018.01) |

(56) References Cited

U.S. PATENT DOCUMENTS

| | | | | |
|---|---|---|---|---|
| 2007/0041207 | A1 | 2/2007 | Ishida | |
| 2009/0154185 | A1 | 6/2009 | Yagi | |
| 2009/0290371 | A1 | 11/2009 | Yagi | |
| 2021/0270438 | A1 | 9/2021 | Suzuki et al. | |
| 2022/0178511 | A1* | 6/2022 | Matsumoto ............. | F21S 41/27 |

FOREIGN PATENT DOCUMENTS

| | | | |
|---|---|---|---|
| JP | 2003168307 | A | 6/2003 |
| JP | 2009146665 | A | 7/2009 |
| JP | 2009283299 | A | 12/2009 |
| JP | 2020170586 | A | 10/2020 |
| WO | 2019244783 | A1 | 12/2019 |
| WO | 2020203641 | A1 | 10/2020 |

OTHER PUBLICATIONS

International Search Report (PCT/ISA/373) with translation mailed on May 24, 2022, by the Japan Patent Office as the International Searching Authority for International Patent Application No. PCT/JP2022/014641. (6 pages).

IPRP and Written Opinion (PCT/ISA/237) with translation mailed on Sep. 12, 2023, by the Japan Patent Office as the International Searching Authority for International Patent Application No. PCT/JP2022/014641. (8 pages).

* cited by examiner

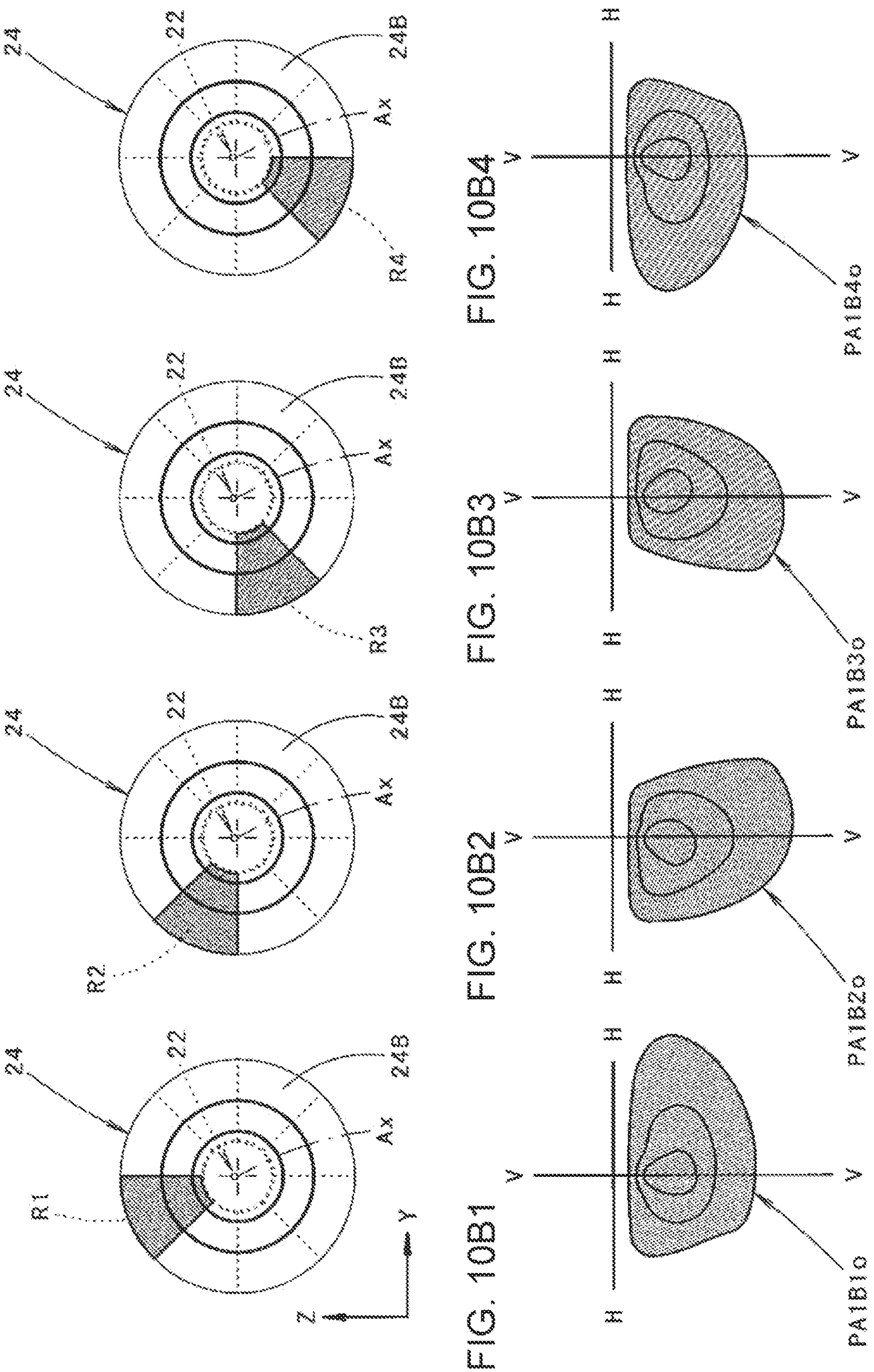
FIG. 10A1
FIG. 10A2
FIG. 10A3
FIG. 10A4
FIG. 10B1
FIG. 10B2
FIG. 10B3
FIG. 10B4

FIG. 12B1
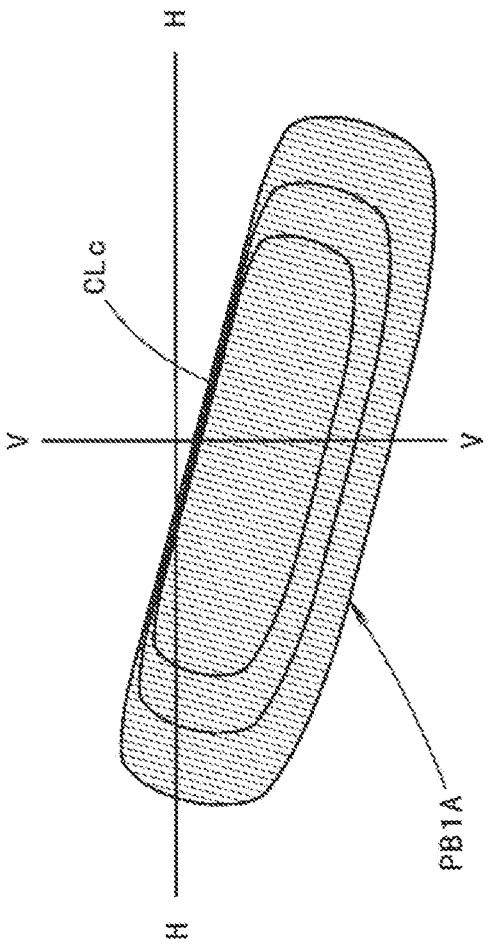
FIG. 12A1
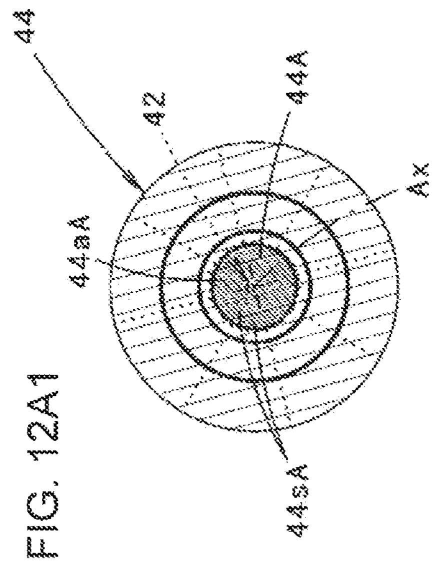
FIG. 12B2
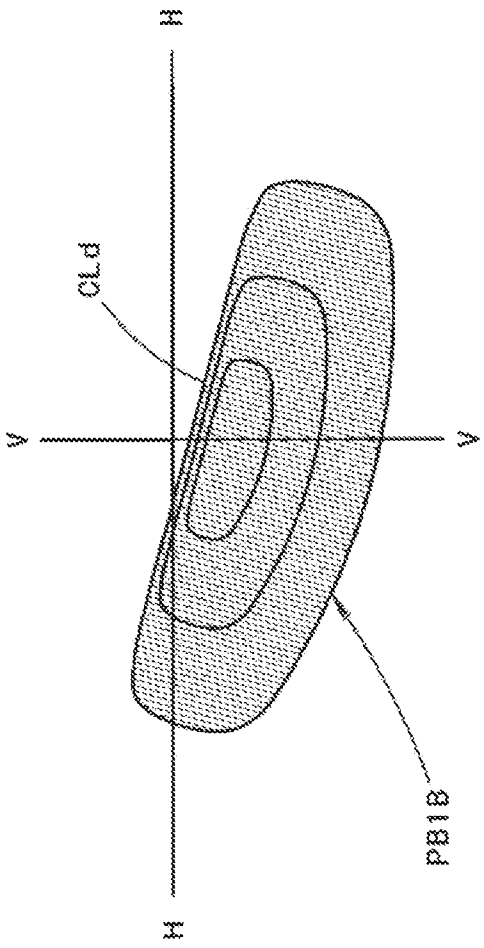
FIG. 12A2
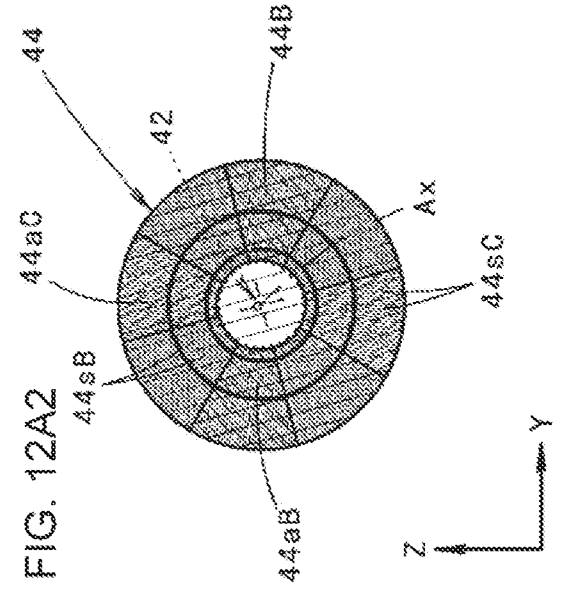

AUTOMOTIVE LAMP

BACKGROUND

1. Technical Field

The present disclosure relates to an automotive lamp.

2. Description of the Related Art

As a configuration of a conventional automotive lamp, an arrangement is known including a lamp unit configured such that the output light from a light-emitting element is emitted toward the front side of the lamp via a translucent member.

As a configuration of a translucent member employed in a lamp unit of such an automotive lamp, an arrangement is described in Patent document 1 (Japanese Patent Application Laid Open No. 2009-146665) including a direct light controller configured to directly output light toward the front side of the lamp after it is incident to a translucent member and a total reflection control unit configured to output light toward the front side of the lamp after the light incident to the translucent member is totally reflected.

Also, as such a translucent member, an arrangement is described in Patent document 2 (Japanese Patent Application Laid Open No. 2009-283299) in which the total reflection face of the total reflection controller is arranged in the form of multiple divided reflection regions in a circumferential portion of the direct light controller.

As with such a lamp unit described in Patent document 1, with such an arrangement employing a configuration including the direct light controller and the total reflection controller as a translucent member thereof, this allows a large part of the output light from the light-emitting element to be output toward the front side of the lamp from the translucent member. This provides improved utilization efficiency of the light flux from a light source.

In this case, by employing such a translucent member as described in Patent document 2, such an arrangement is capable of aligning the upper-end positions of the light distribution patterns formed by reflected light from each reflection region that forms the total reflection face of the total reflection controller. As a light distribution pattern formed by the output light from the total reflection controller, such an arrangement is capable of such an arrangement is capable of forming a light distribution pattern with an upper edge that defines a cutoff line.

SUMMARY

The present disclosure has been made in view of such a situation. Accordingly, it is an exemplary purpose of an embodiment of the present disclosure to provide an automotive lamp that is switchable between a high-beam mode and a low-beam mode.

An embodiment of the present disclosure relates to an automotive lamp structured to be switchable between a low-beam mode and a high-beam mode. The automotive lamp includes: a first lamp unit structured to illuminate a first region having its longitudinal direction in the horizontal direction, and having an upper edge that defines a horizontal cutoff line in both the low-beam mode and the high-beam mode; a second lamp unit structured to illuminate a second region having its longitudinal direction in a direction inclined with respect to the horizontal direction and having an upper edge that defines an oblique cutoff line in both the low-beam mode and the high-beam mode; and a third lamp unit structured to illuminate a third region having its longitudinal direction in a direction inclined with respect to the horizontal direction and having a lower edge parallel to the oblique cutoff line in the high-beam mode.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 10A1 through 10A4 and FIGS. 10B1 through 10B4 are diagrams for explaining a process for forming the light distribution pattern PA1 shown in FIG. 8A;

FIGS. 12A1 and 12A2 and FIGS. 12B1 and 12B2 are diagrams for explaining a process for forming the light distribution pattern PB1 shown in FIG. 8A;

DETAILED DESCRIPTION

Outline of Embodiments

Figure 1:
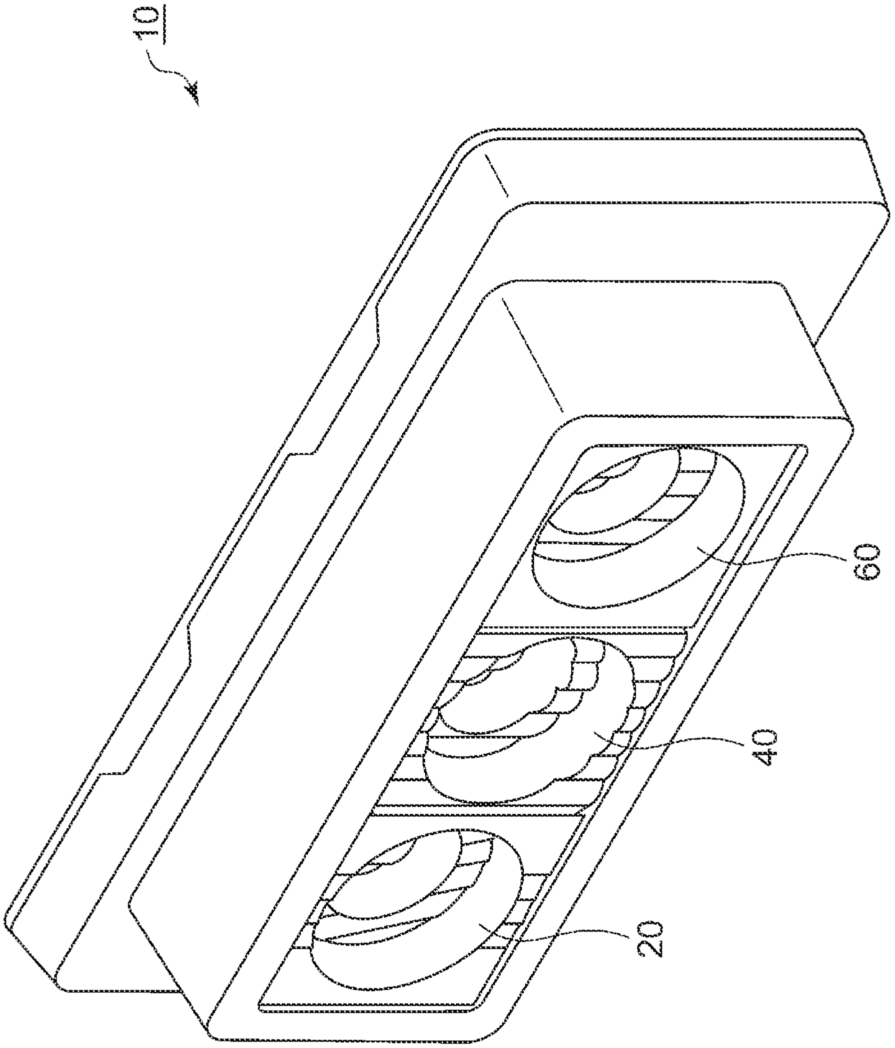
FIG. 1 is a diagram showing an automotive lamp according to an embodiment.

Description will be made regarding the outline of several exemplary embodiments of the present disclosure. The outline is a simplified explanation regarding several concepts of one or multiple embodiments as a preface to the detailed description described later in order to provide a basic understanding of the embodiments. That is to say, the outline described below is by no means intended to restrict the scope of the present invention and the present disclosure. Furthermore, the outline described below is by no means a comprehensive outline of all possible embodiments. That is to say, the outline is by no means intended to identify the indispensable or essential elements of all the embodiments, and is by no means intended to define the scope of a part of or all the embodiments. For convenience, in some cases, an "embodiment" as used in the present specification represents a single or multiple embodiments (examples and modifications) disclosed in the present specification.

An automotive lamp according one embodiment is structured to be switchable between a low-beam mode and a high-beam mode. The automotive lamp includes: a first lamp unit structured to illuminate a first region having its longitudinal direction in the horizontal direction and having an upper edge that defines a horizontal cutoff line in both the low-beam mode and the high-beam mode; a second lamp unit structured to illuminate a second region having its longitudinal direction in a direction inclined with respect to the horizontal direction, and having an upper edge that defines an oblique cutoff line in both the low-beam mode and the high-beam mode; and a third lamp unit structured to illuminate a third region having its longitudinal direction in a direction inclined with respect to the horizontal direction, and having its lower edge parallel to the oblique cutoff line in the high-beam mode.

In the low-beam mode, the first lamp unit illuminates a wide range below the horizontal cutoff line, and the second lamp unit illuminates a region extending along the oblique cutoff line. This is capable of forming a light distribution suitable for the low beam.

In the high-beam mode, the third lamp unit additionally illuminates a third region that mainly occupies a region above the oblique cutoff line. This is capable of forming a light distribution for the high beam.

The kind of the "light-emitting element" is not restricted in particular. For example, a light-emitting diode, laser diode, organic electro-luminescence (EL) element, or the like, may be employed.

In one embodiment, the lower edge of the third region may be aligned with the oblique cutoff line. Also, the lower edge of the third region may be positioned below the oblique cutoff line. Also, the second region and the third region may overlap.

In one embodiment, the first region may have a longitudinal length that is longer than those of the second region and the third region.

In one embodiment, at least one from among the first lamp unit and the second lamp unit may provide a lower light intensity in the high beam mode than the light intensity thereof in the high-beam mode. With such an arrangement in which, in the high-beam mode, at least one from among the first lamp unit and the second lamp unit is instructed to emit light with a reduced light intensity, this is capable of offsetting an increase in power consumption and an increase of heat generation.

In one embodiment, the first lamp unit through the third lamp unit may each have substantially the same optical configuration.

In one embodiment, the first lamp unit through the third lamp unit may each include: a light-emitting element; and a translucent member structured to emit output light of the light-emitting element toward the front side of the lamp. Also, the translucent member may include: a direct light controller structured to directly output light from the light-emitting element toward the front side of the lamp after it is incident to the translucent member; and a total reflection controller structured to output light toward the front side of the lamp after the light emitted from the light-emitting element and incident to the translucent member is totally reflected. Also, the total reflection controller may have a total reflection face divided into multiple reflection regions defined in a circumferential portion of the direct light controller extending in the circumferential direction. Also, multiple diffusion lens elements may be formed in an output face of the translucent member so as to diffuse output light from the translucent member in a predetermined direction.

This arrangement is capable of outputting a large part of the light output from the light-emitting element toward the front side of the lamp. This provides improved utilization efficiency of the light flux of the light source.

In this case, in each of the first lamp unit and the second lamp unit, the translucent member includes the total reflection controller having the total reflection face divided into multiple reflection regions in a circumferential portion of the direct light controller extending in the circumferential direction. Accordingly, this is capable of easily aligning the upper edge positions formed by the reflected light from the respective reflection regions.

In one embodiment, the multiple diffusion lens elements of the first lamp unit may be arranged in the horizontal direction as viewed in a front view. Also, the multiple diffusion lens elements of the second lamp unit and the third lamp unit may be arranged in an oblique direction as viewed in a front view.

That is to say, multiple horizontal diffusion lens elements are formed in the output face of the translucent member of the first lamp unit so as to diffuse the output light from the translucent member in the horizontal direction. Furthermore, multiple oblique diffusion lens elements are formed in the output face of the translucent member of the second lamp unit so as to diffuse the output light from the translucent member in an oblique direction inclined with respect to the horizontal direction. This is capable of forming a bright light distribution pattern having an upper edge that defines the horizontal cutoff line and the oblique cutoff line by the light emitted from the first lamp unit and the second lamp unit. Moreover, multiple oblique diffusion lens elements are formed in the third lamp unit so as to diffuse the light in an oblique direction inclined with respect to the horizontal direction. This is capable of suitably illuminating the third region extending along the oblique cutoff line.

In one embodiment, the translucent members of the first lamp unit, the second lamp unit, and the third lamp unit may be monolithically formed as a single unit.

In one embodiment, the light-emitting elements of the first lamp unit, the second lamp unit, and the third lamp unit and a lighting circuit thereof may be mounted on the same substrate.

In one embodiment, the first lamp unit through the third lamp unit may be arranged such that the centers thereof are positioned at vertices of a virtual triangle as viewed in a front view.

In one embodiment, the first lamp unit through the third lamp unit may be arranged on the same straight line as viewed in a front view.

In one embodiment, the translucent member of the first lamp unit may be configured such that the horizontal diffusion lens element formed in the output face of the direct light controller thereof has a diffusion angle that is larger than that of the horizontal diffusion lens element formed in the output face of the total reflection controller. Also, the translucent member of the second lamp unit may be configured such that the oblique diffusion lens element formed in the output face of the direct light controller thereof has a diffusion angle that is larger than that of the oblique diffusion lens element formed in the output face of the total reflection controller.

With this arrangement, the direct light controller is arranged at a position closer to the light-emitting element than the total reflection controller. Accordingly, the light distribution pattern formed by the output light from the direct light controller is larger than that formed by the output light from the total reflection controller. Accordingly, with such an arrangement in which the horizontal diffusion lens element and the oblique diffusion lens element formed in the output face of the direct light controller are designed to have diffusion angles that are larger than those of the horizontal diffusion lens element and the oblique diffusion lens element formed in the output face of the total reflection controller, this is capable of providing the light distribution pattern formed by the light emitted from the first lamp unit and the second lamp unit with little unevenness.

In one embodiment, in the first lamp unit, the translucent member may include the total reflection controller having an output face divided into an inner circumferential ring-shaped region and an outer circumferential ring-shaped region. Furthermore, the horizontal diffusion lens element formed in the inner circumferential ring-shaped region is configured to have a diffusion angle that is larger than that of the horizontal diffusion lens element formed in the outer circumferential ring-shaped region. Moreover, in the second lamp unit, the translucent member may include the total reflection controller having an output face divided into an inner circumferential ring-shaped region and an outer circumferential ring-shaped region. Furthermore, the oblique diffusion lens element formed in the inner circumferential ring-shaped region is configured to have a diffusion angle that is larger than that of the oblique diffusion lens element formed in the outer circumferential ring-shaped region.

That is to say, the light distribution pattern formed by the output light from the inner circumferential ring-shaped region is larger than that formed by the output light from the outer circumferential ring-shaped region. With such an arrangement in which the horizontal diffusion lens element and the oblique diffusion lens element formed in the inner circumferential ring-shaped regions are designed to have diffusion angles that are larger than those of the horizontal diffusion lens element and the oblique diffusion lens element formed in the outer circumferential ring-shaped regions, this is capable of forming a light distribution pattern formed by the light emitted from the first lamp unit and the second lamp unit with little unevenness.

In one embodiment, in each of the first lamp unit and the second lamp unit, the translucent member is configured such that the output face of the total reflection controller is arranged at a position shifted toward the front side of the lamp with respect to the output face of the direct light controller, and such that the outer circumferential ring-shaped region of the output face of the total reflection controller is arranged at a position shifted toward the front side of the lamp with respect to the inner circumferential ring-shaped region of the output face. This allows the translucent member to be designed to have a reduced thickness.

With this, the translucent member of the first lamp unit is configured such that the horizontal diffusion lens element formed in the output face of the direct light controller and the horizontal diffusion lens element formed in the inner circumferential ring-shaped region of the output face of the total reflection controller have diffusion angles that are larger as the distance from the light-emitting element is smaller as viewed in a front view of the lamp. Furthermore, the translucent member of the second lamp unit is configured such that the oblique diffusion lens element formed in the output face of the direct light controller and the oblique diffusion lens element formed in the inner circumferential ring-shaped region of the output face of the total reflection controller have diffusion angles that are larger as the distance from the light-emitting element is smaller as viewed in a front view of the lamp. Such an arrangement provides the following effects.

That is to say, such an arrangement suppresses the potential for the output light from the output face of the direct light controller to be blocked by a vertical wall portion arranged on the outer circumferential side thereof. Furthermore, such an arrangement suppresses the potential for the output light from the inner circumferential ring-shaped region of the output face of the total reflection controller to be blocked by a vertical wall portion arranged on the outer circumferential side thereof. With this, such an arrangement provides improved utilization efficiency of the light flux from the light source. Furthermore, this is capable of effectively suppressing the occurrence of stray light.

Embodiments

Description will be made below regarding preferred embodiments with reference to the drawings. In each drawing, the same or similar components, members, and processes are denoted by the same reference numerals, and redundant description thereof will be omitted as appropriate. The embodiments have been described for exemplary purposes only, and are by no means intended to restrict the present disclosure and the present invention. Also, it is not necessarily essential for the present disclosure and the present invention that all the features or a combination thereof be provided as described in the embodiments.

In the present specification, a state represented by the phrase "the member A is coupled to the member B" includes a state in which the member A is indirectly coupled to the member B via another member that does not substantially affect the electrical connection between them, or that does not damage the functions or effects of the connection between them, in addition to a state in which they are physically and directly coupled.

Similarly, a state represented by the phrase "the member C is provided between the member A and the member B" includes a state in which the member A is indirectly coupled to the member C, or the member B is indirectly coupled to the member C via another member that does not substantially affect the electrical connection between them, or that does not damage the functions or effects of the connection between them, in addition to a state in which they are directly coupled.

FIG. 1 is a diagram showing an automotive lamp 10 according to an embodiment. The automotive lamp 10 includes a first lamp unit 20, a second lamp unit 40, and a third lamp unit 60. The automotive lamp 10 is switchable between a high-beam mode and a low-beam mode.

The first lamp unit 20, the second lamp unit 40, and the third lamp unit 60 are optically designed so as to illuminate different regions on a virtual vertical screen. The order of the first lamp unit 20, the second lamp unit 40, and the third lamp unit 60 is not restricted to such an arrangement shown in the drawing. Also, the lamp units may be interchanged.

In the low-beam mode and the high-beam mode, the first lamp unit 20 is set to the lighting-on state. In this state, the first lamp unit 20 illuminates a first region PA1 having its longitudinal direction in the horizontal direction, and having its upper edge forms a horizontal cutoff line.

In the low-beam mode and the high-beam mode, the second lamp unit 40 is set to the lighting-on state. In this state, the second lamp unit 40 illuminates a second region PB1 having its longitudinal direction in a direction inclined with respect to the horizontal direction and having its upper edge forms an oblique cutoff line.

In the high-beam mode, the third lamp unit 60 is set to the lighting-on state. In this state, the third lamp unit 60 illuminates a third region PC1 having its longitudinal direction in a direction inclined with respect to the horizontal direction, and having its lower edge is parallel to the oblique cutoff line.

As described later, the first lamp unit 20, the second lamp unit 40, and the third lamp unit 60 may each have substantially the same optical configuration.

Figure 2A:
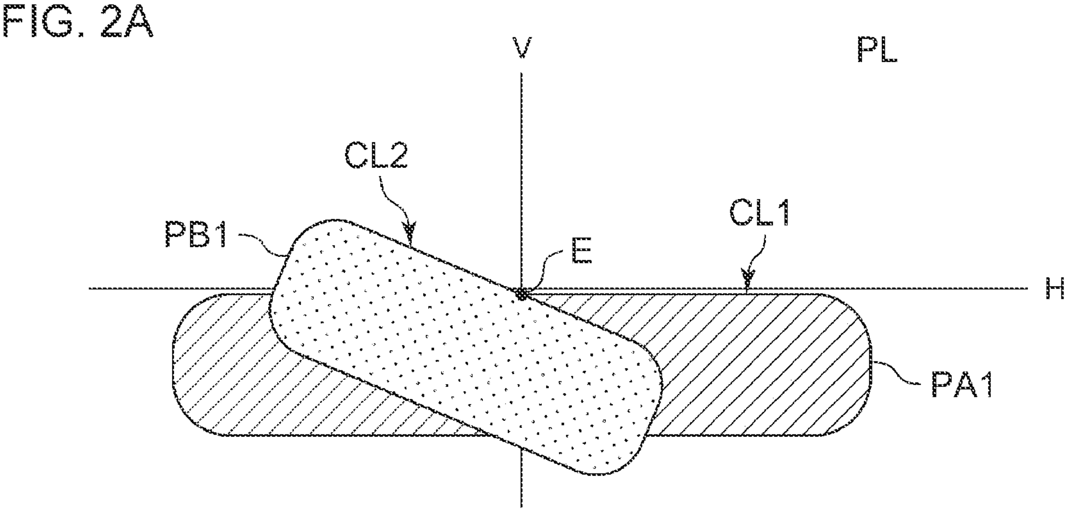
FIGS. 2A and 2B are diagrams showing a low-beam distribution and a high-beam distribution formed by the automotive lamp shown in FIG. 1.
Figure 2B:
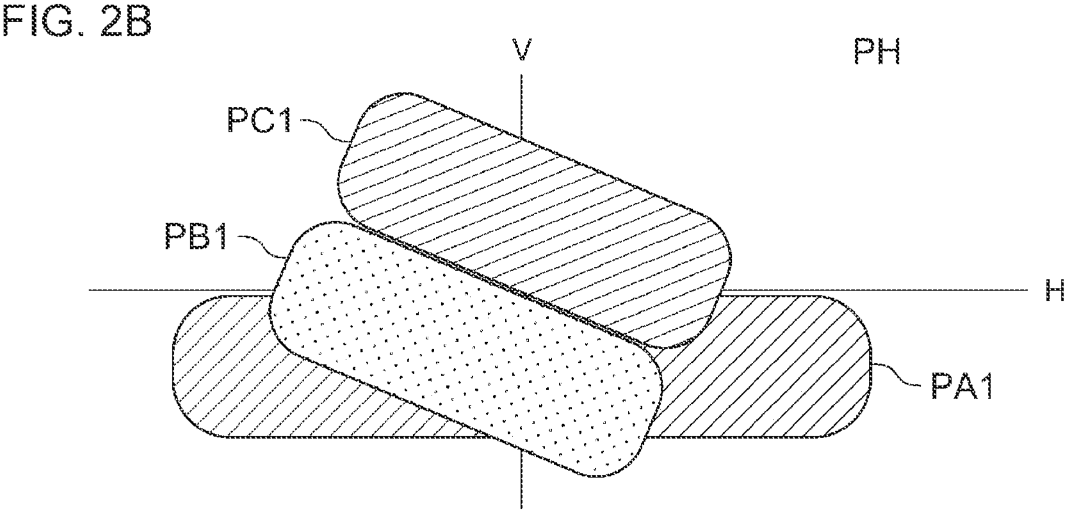

The above is the configuration of the automotive lamp 10. FIGS. 2A and 2B are diagrams showing the low-beam distribution and the high-beam distribution formed by the automotive lamp 10 shown in FIG. 1. FIG. 2A shows a light distribution PL in the low-beam mode. In this mode, the first region PA1 and the second region PB1 are illuminated. The upper edge of the first region PA1 forms the horizontal cutoff line CL1. The upper edge of the second region PB1 forms the oblique cutoff line CL2. The intersection of the two cutoff lines CL1 and CL2 will be referred to as an "elbow point E".

FIG. 2B shows a light distribution PH in the high-beam mode. In addition to the first region PA1 and the second region PB1, the third region PC1 is illuminated. The lower edge of the third region PC is formed such that it extends along the horizontal cutoff line CL1, i.e., the upper edge of the second region PA2.

The third region PC1 may be formed such that it slightly overlaps the second region PB1. This is capable of preventing the occurrence of a region that cannot be illuminated even in a case in which optical axis misalignment has occurred in the second lamp unit 40 or the third lamp unit 60.

For example, a portion having a length (width) that is smaller than 10% in the lateral direction of the third region PC1 may overlap the second region PB1.

The first region PA1 has a length in the longitudinal direction (horizontal direction) that is larger than those of the second region PB1 and the third region PC1 in their longitudinal direction (inclined direction). FIG. 2 shows an arrangement in which the third region PC1 has a length that is equal to that of the second region PB1. However, the present invention is not restricted to such an arrangement. Also, the third region PC1 may have a length that is shorter or longer than that of the second region PB1.

The above is the configuration of the automotive lamp 10.

In the low-beam mode, the automotive lamp 10 instructs the first lamp unit 20 to illuminate a wide region below the horizontal cutoff line CL1, and instructs the second lamp unit 40 to illuminate a region that extends along the oblique cutoff line CL2, so as to form the light distribution PL suitable for the low beam.

On the other hand, in the high-beam mode, the third lamp unit 60 illuminates the third region PC1 as an additional illuminated region that mainly occupies the region above the oblique cutoff line CL2 so as to form the high-beam light distribution PH. That is to say, instead of designing the illuminated region (third region PC1) specific to the high beam to be bilaterally symmetrical, the third region PC1 is designed such that it includes only a small region that is illuminated by the low-beam optical system (first region and second region), i.e., such that, as its major part, it occupies a large region that is not illuminated by the low-beam optical system. This is capable of providing a sufficient light intensity (light amount) for the region specific to the high beam. For example, the third region PC1 is preferably designed to have a region overlapping the first region PA1 or the second region PB1 of 30% or less of the overall area of the third region PC1. More preferably, the third region PC1 is preferably designed to have such an overlapping region of 20% or less.

In one embodiment, in the high-beam mode, the first lamp unit 20 and the second lamp unit 40 may provide a light intensity that is lower than that in the low-beam mode. With such an arrangement in which the first lamp unit 20 and the second lamp unit 40 each provide low light intensity in the high-beam mode, such an arrangement is capable of offsetting an increase in power consumption and an increase in heat generation due to the third lamp unit 60 being additionally turned on.

Specific description will be made regarding a configuration of the automotive lamp 10.

Figure 3:
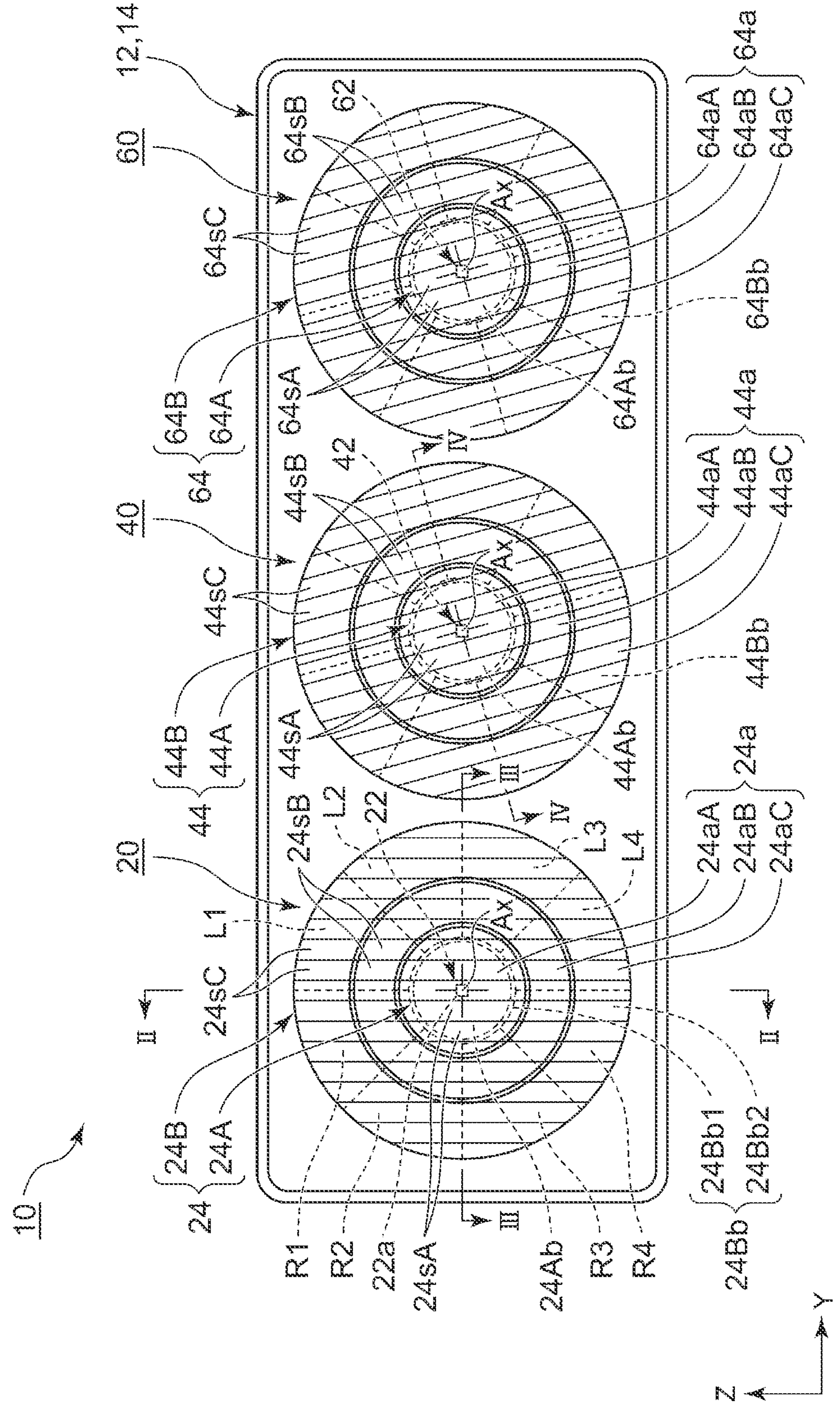
FIG. 3 is a front view showing an automotive lamp according to an embodiment.

FIG. 3 is a front view showing the automotive lamp according to one embodiment. In this example, the first lamp unit 20, the second lamp unit 40, and the third lamp unit are arranged in a row in the horizontal direction.

In the drawings used as a reference in the present specification, the direction indicated by "X" indicates the "front side" of the automotive lamp 10 (which also indicates the "front side" of the vehicle). The direction indicated by "Y" indicates the "left direction" orthogonal to the "front-side direction" (which also indicates the "left direction" of the vehicle and the "right direction" as viewed in the front view of the lamp). The direction indicated by "Z" indicates the "upper direction". The same can be said of the other drawings.

As shown in FIG. 3, the automotive lamp 10 according to the present embodiment is a headlamp provided to the front-end portion of the vehicle. The automotive lamp 10 has a configuration in which the first lamp unit 20, the second lamp unit 40, and the third lamp unit 60, each configured as a projector-type lamp, are built into a lamp chamber formed of a lamp body 12 and a translucent cover 14 configured to pass through light and mounted on the front-end opening portion of the lamp body 12.

With this, the automotive lamp 10 forms a low-beam light distribution pattern using light emitted from the first lamp unit 20 and the second lamp unit 40. Furthermore, by providing the light emitted from the third lamp unit 60 as additional emitted light, such an arrangement is capable of forming a high-beam light distribution pattern.

First, description will be made regarding a configuration of the first lamp unit 20.

Figure 4:
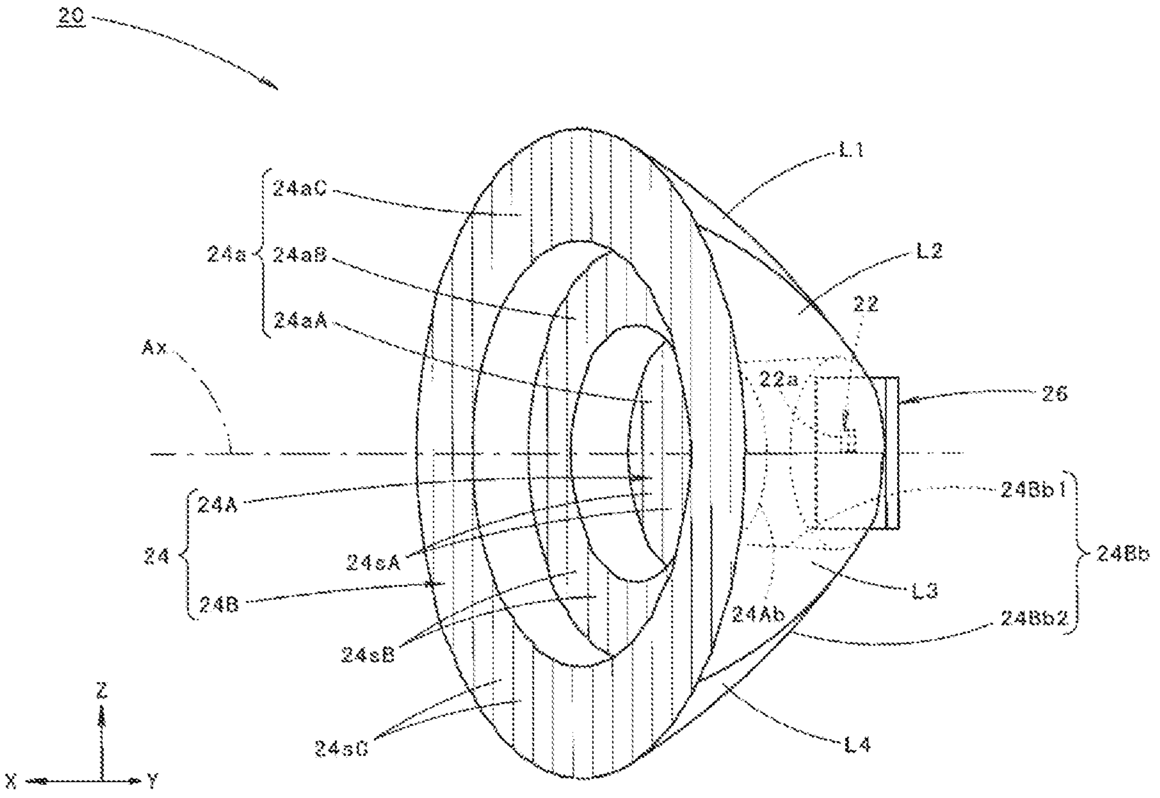
FIG. 4 is a perspective diagram of a first lamp unit.
Figure 5:
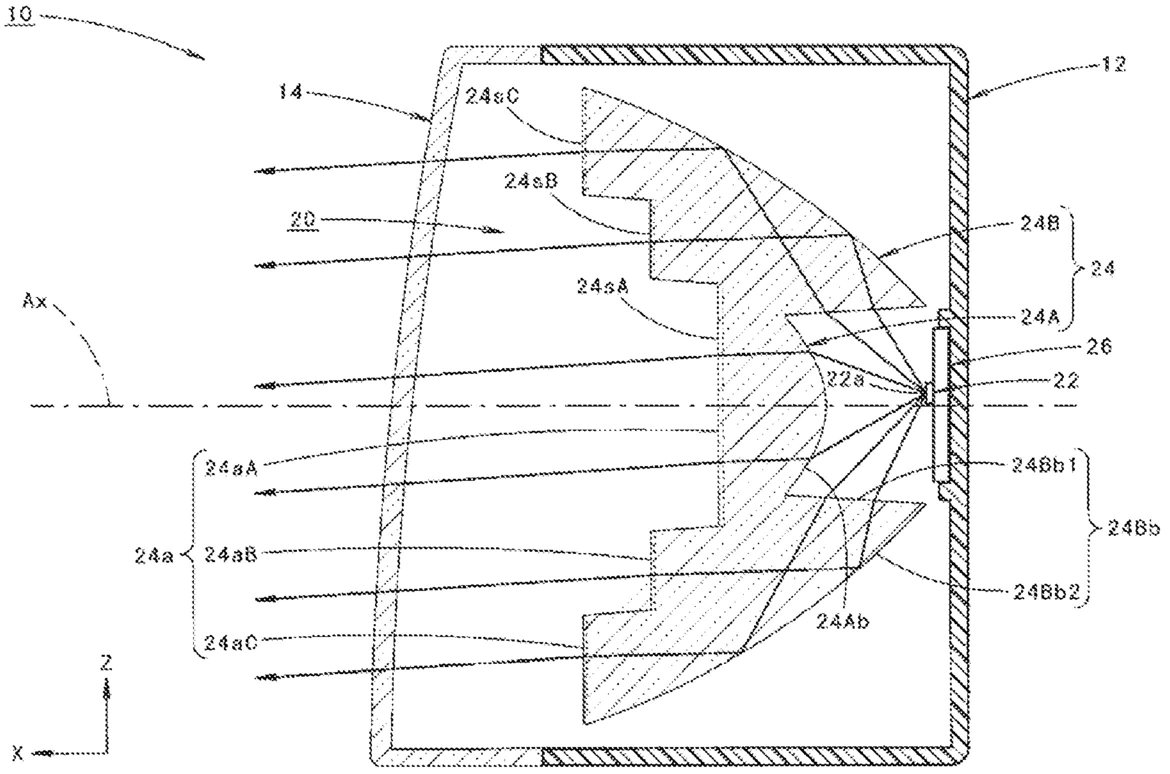
FIG. 5 is a cross-sectional diagram (cross-sectional diagram taken along line II-II shown in FIG. 3) of the first lamp unit.
Figure 6:
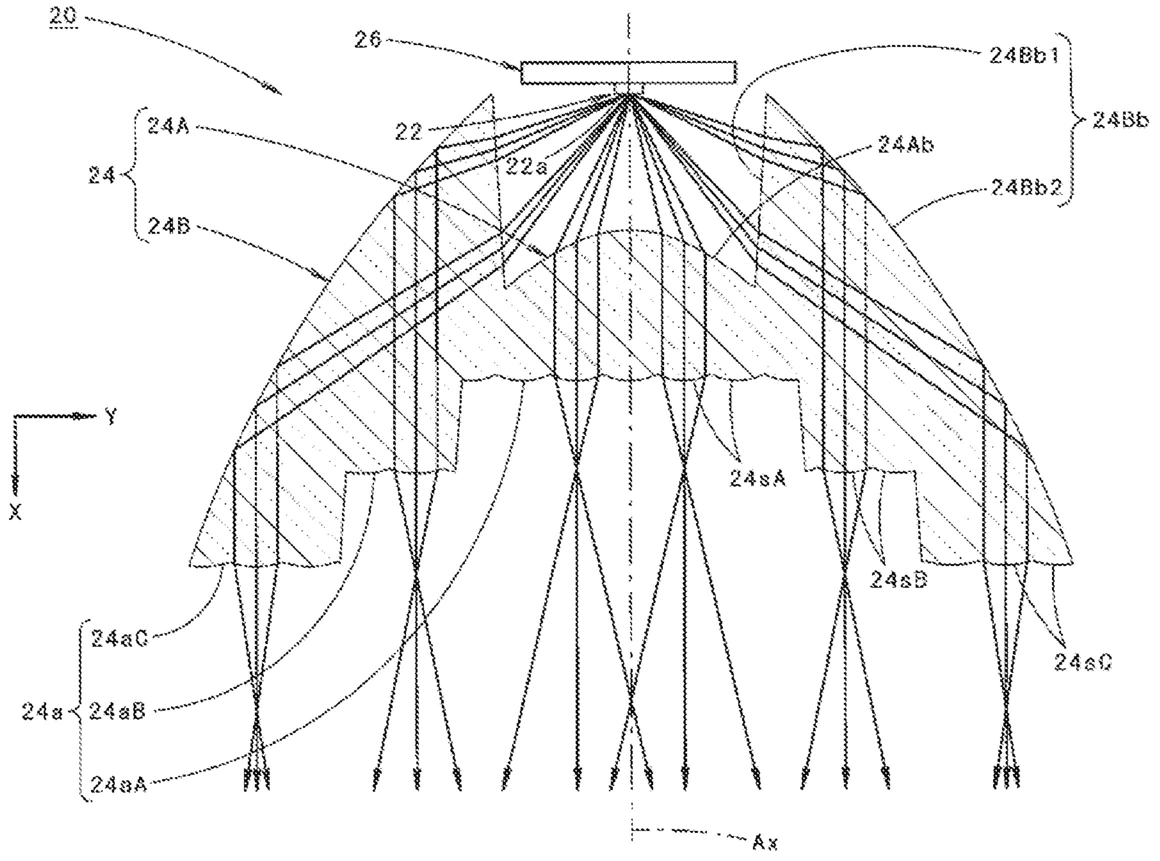
FIG. 6 is a cross-sectional diagram (cross-sectional diagram taken along line shown in FIG. 3) of the first lamp unit.

FIG. 4 is a perspective diagram of the first lamp unit 20. FIG. 5 is a cross-sectional diagram of the first lamp unit 20 (cross-sectional diagram taken along line II-II of FIG. 3). FIG. 6 is a cross-sectional diagram of the first lamp unit 20 (cross-sectional diagram taken along line II-III of FIG. 3).

As shown in FIG. 4, the first lamp unit 20 is configured to emit light from a light-emitting element 22 via a translucent member 24 toward the front side of the lamp.

The light-emitting element 22 is configured as a white light-emitting diode having a rectangular (e.g., square) light-emitting face 22*a*. The light-emitting element 22 is arranged such that it is directed toward the front side of the lamp (which is also the front side of the vehicle) in a state in which it is mounted on the substrate 26. The substrate 26 is supported by the lamp body 12.

The light-emitting element 22 is arranged in the vicinity of the upper side of the axis Ax that extends in the front-rear direction of the lamp such that the lower edge of the light-emitting face 22*a* extends in the horizontal direction.

The translucent member 24 is configured as a translucent synthetic resin molded product such as an acrylic resin or the like. The translucent member 24 is arranged on the front side of the lamp of the light-emitting element 22. The translucent member 24 is supported by the lamp body 12 via an unshown support structure.

The translucent member 24 has a configuration including a direct light controller 24A configured to directly output the light incident to the translucent member 24 from the light-emitting element 22 toward the front side of the lamp, and a total reflection controller 24B configured to output the light incident to the translucent member 24 from the light-emitting element 22 toward the front side of the lamp after total reflection.

The direct light controller 24A is designed as a circular region with the axis Ax as its center as viewed in a front view of the lamp.

The direct light controller 24A has a back face 24Ab configured as a rotational convex curved face with the axis Ax as its center. With this, the direct light controller 24A is configured such that the light emitted from the center of light emission provided by the light-emitting element 22 is incident to its back face 24Ab as parallel light slightly inclined toward the lower side.

The total reflection controller 24B is a region positioned on the outer circumferential side of the direct light controller 24A. The total reflection controller 24B is designed as a circular region with the axis Ax as its center as viewed in a front view of the lamp.

The total reflection controller 24B has a back face 24Bb including an incident face 24Bb1 configured to refract the light emitted from the light-emitting element 22 such that it passes through in a direction away from the axis Ax, and a total reflection face 24Bb2 configured to totally reflect the incident light from the incident face 24Bb1 toward the front side of the lamp.

The incident face 24Bb1 is configured as a conical face that is similar to a cylindrical face with the axis Ax as its center. The total reflection face 24Bb2 is configured as a curved face with a rotational convex curved face as a reference face.

Furthermore, the total reflection controller 24B is configured such that the total reflection face 24Bb2 reflects the light emitted from the center of light emission of the light-emitting element 22 and incident via the incident face 24Bb1 as parallel light in a direction slightly inclined toward the lower side.

The total reflection face 24Bb2 of the total reflection controller 24B is divided into eight reflection regions L1, L2, L3, L4, R1, R2, R3, and R4 in the circumferential direction with the axis Ax as its center. Specifically, the eight reflection regions L1 through L4 and R1 through R4 each have a fan-shaped external structure of the same size with the axis Ax as their center as viewed in a front view of the light. Furthermore, the light reflection regions L1 through L4 and R1 through R4 are arranged on both the left and right sides of a vertical plane including the axis Ax in a bilaterally symmetrical position relation.

The eight reflection regions L1 through L4 and R1 through R4 are designed to have slightly different light reflection angles in the vertical direction for each reflection region. However, a pair of the reflection regions having a bilaterally symmetrical position relation (i.e., each of the reflection regions L1 through L4 and each of the reflection regions R1 through R4) are designed to have a bilaterally symmetrical surface structure.

The output face 24*a* of the translucent member 24 is configured as three output regions 24*a*A, 24*a*B, and 24*a*C divided concentrically as viewed in a front view of the lamp.

The emitting region 24*a*A positioned at the center is a circular region with the axis Ax as its center in a front view of the lamp. The emitting region 24*a*A is designed to have a diameter that is slightly larger than that of the inner circumferential edge of the total reflection face 24Bb2 of the total reflection controller 24B.

The output region 24*a*B adjacent to the outer circumferential side of the output region 24*a*A is configured as a ring-shaped region such that it is shifted toward the front side of the lamp with respect to the output region 24*a*A. Furthermore, the output region 24*a*C adjacent to the outer circumferential side of the output region 24*a*B is configured as a ring-shaped region such that it is shifted to the front side of the lamp with respect to the output region 24*a*B.

The output regions 24*a*A through 24*a*C are respectively provided with multiple horizontal diffusion lens elements 24*s*A, 24*s*B, and 24*s*C configured to diffuse light from the light-emitting element 22 after it reaches the corresponding output regions 24*a*A through 24*a*C. The horizontal diffusion lens elements 24*s*A through 24*s*C are each configured in a convex cylindrical lens structure extending in the vertical direction. The horizontal diffusion lens elements 24*s*A through 24*s*C are configured to diffuse the light from the light-emitting element 22 equally on both the left and right sides in the horizontal direction.

With such an arrangement, the horizontal diffusion lens element 24*s*A formed in the output region 24*a*A is designed to have a diffusion angle that is larger than that of the horizontal diffusion lens element 24*s*B formed in the output region 24*a*B. Furthermore, the horizontal diffusion lens element 24*s*B formed in the output region 24*a*B is designed to have a diffusion angle that is larger than that of the horizontal diffusion lens element 24*s*C formed in the output region 24*a*C.

Next, description will be made regarding a configuration of the second lamp unit 40. The second lamp unit 40 has substantially the same optical configuration as that of the first lamp unit 20.

Figure 7:
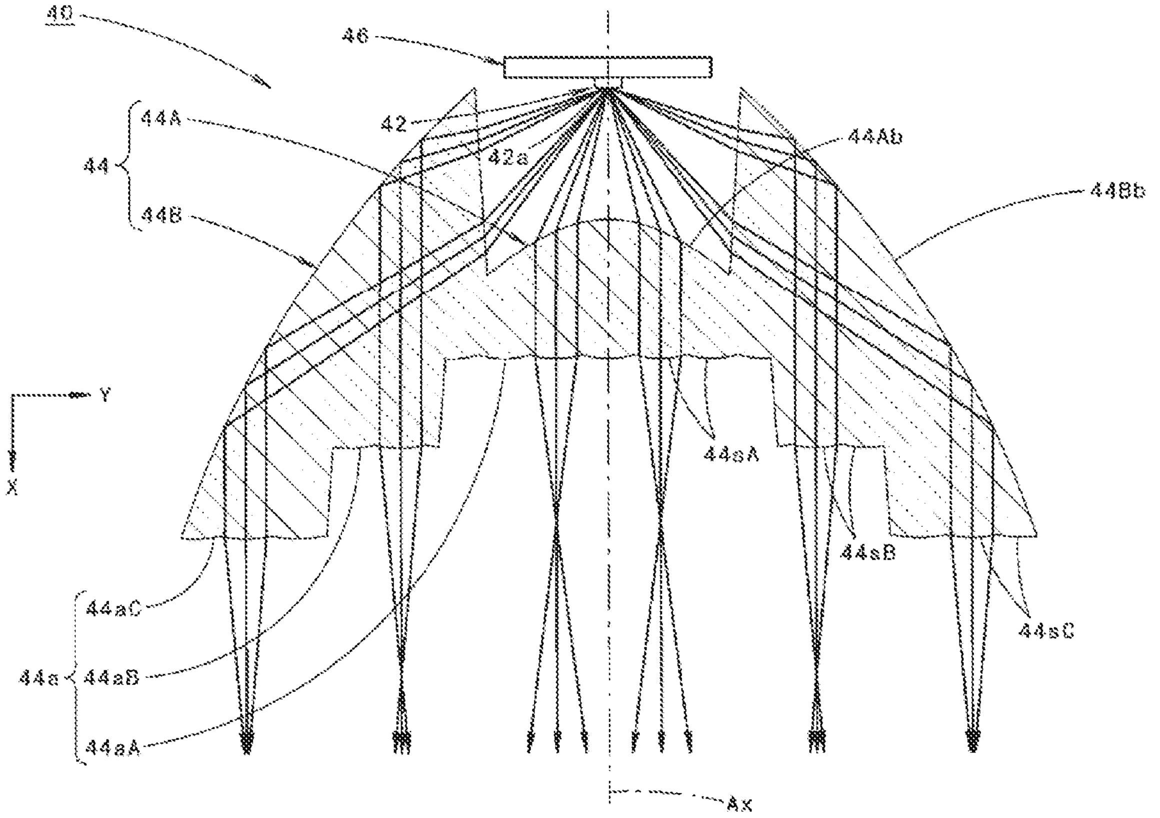
FIG. 7 is a cross-sectional diagram of a second lamp unit.

FIG. 7 is a cross-sectional diagram of the second lamp unit 40 (cross-sectional diagram taken along line IV-IV shown in FIG. 3). As shown in FIG. 7, the second lamp unit 40 is configured to emit the output light from a light-emitting element 42 toward the front side of the lamp via a translucent member 44.

It should be noted that the second lamp unit 40 has the same configuration except that it has been rotated clockwise (counterclockwise in a front view of the lamp) by a predetermined angle (specifically, 15 degrees) around the axis Ax extending in the front-rear direction of the lamp as shown in FIG. 3, and the output face 44*a* of the translucent member 44 has a configuration that is partially different from that of the lamp unit 20.

That is to say, the light-emitting element 42 of the second lamp unit 40 has the same configuration as that of the light-emitting element 22 of the first lamp unit 20. The light-emitting element 42 is arranged such that it faces the front side of the lamp in a state in which it is mounted on a substrate 46 in the vicinity of the upper side of the axis Ax.

Furthermore, the translucent member 44 of the second lamp unit 40 has a configuration provided with a direct light controller 44A configured to directly output the light from the light-emitting element 42 toward the front side of the lamp after it is incident to the translucent member 44, and a total reflection controller 44B configured to output the light from the light-emitting element 42 toward the front side of the lamp after it is input to the translucent member 44 and is totally reflected.

The back face 44Ab of the direct light controller 44A and the back face 44Bb of the total reflection controller 44B have the same configurations as that of the first lamp unit 20 except that they have been rotated by 15 degrees clockwise.

As with the first lamp unit 20, the output face 44*a* of the translucent member 44 is configured as three output regions 44*a*A, 44*a*B, and 44*a*C divided concentrically as viewed in a front view of the lamp. The output regions 44*a*A through 44*a*C are provided with oblique diffusion lens elements 44*s*A, 44*s*B, and 44*s*C each configured to diffuse the output light emitted from the translucent member 44 in an oblique direction of 15 degrees with respect to the horizontal direction.

The oblique diffusion lens elements 44*s*A through 44*s*C are each configured in a convex cylindrical lens structure extending in a direction that is orthogonal to the oblique direction. The oblique diffusion lens elements 44*s*A through 44*s*C are configured to diffuse the light from the light-emitting element 42 equally on both the left and right sides in the oblique direction.

It should be noted that the oblique diffusion lens elements 24*s*A through 24*s*C are each designed to have a diffusion angle that is smaller than (e.g., on the order of half) the diffusion angle of the corresponding one from among the horizontal diffusion lens elements 24*s*A through 24*s*C included in the lamp unit 20.

In this case, the oblique diffusion lens element 44*s*A is designed to have a diffusion angle that is larger than that of the oblique diffusion lens element 44*s*B. Furthermore, the oblique diffusion lens element 44*s*B is designed to have a diffusion angle that is larger than that of the oblique diffusion lens element 44*s*C.

Next, description will be made regarding a configuration of the third lamp unit 60.

Referring to FIG. 3, as with the first lamp unit the third lamp unit 60 is also configured to emit the output light from a light-emitting element 62 toward the front side of the lamp via a translucent member 64.

The third lamp unit 60 has substantially the same basic configuration as that of the second lamp unit 40.

The output face 44*a* of the translucent member 64 is configured as three output regions 64*a*A, 64*a*B, and 64*a*C divided concentrically as viewed in a front view of the light. The output regions 64*a*A through 64*a*C are provided with oblique diffusion lens elements 64*s*A, 64*s*B, and 64*s*C each configured to diffuse the output light emitted from the translucent member 64 in an oblique direction inclined by 15 degrees with respect to the horizontal direction.

The oblique diffusion lens elements 64*s*A through 64*s*C are each configured in a convex cylindrical lens structure extending in a direction that is orthogonal to the oblique direction. The oblique diffusion lens elements 64*s*A through 64*s*C are configured to diffuse the light from the light-emitting element 62 equally on both the left and right sides in the oblique direction.

The oblique diffusion lens elements 64*s*A through 64*s*C are each configured to have a diffusion angle on the same order as those of the oblique diffusion lens elements 44*s*A through 44*s*C of the second lamp unit 40, and that is smaller than (e.g., on the order of half) those of the horizontal diffusion lens elements 24*s*A through 24*s*C in the lamp unit 20.

The oblique diffusion lens element 64*s*A is designed to have a diffusion angle that is larger than that of the oblique diffusion lens element 64*s*B. Furthermore, the oblique diffusion lens element 64*s*B is designed to have a diffusion angle that is larger than that of the oblique diffusion lens element 64*s*C.

Figure 8A:
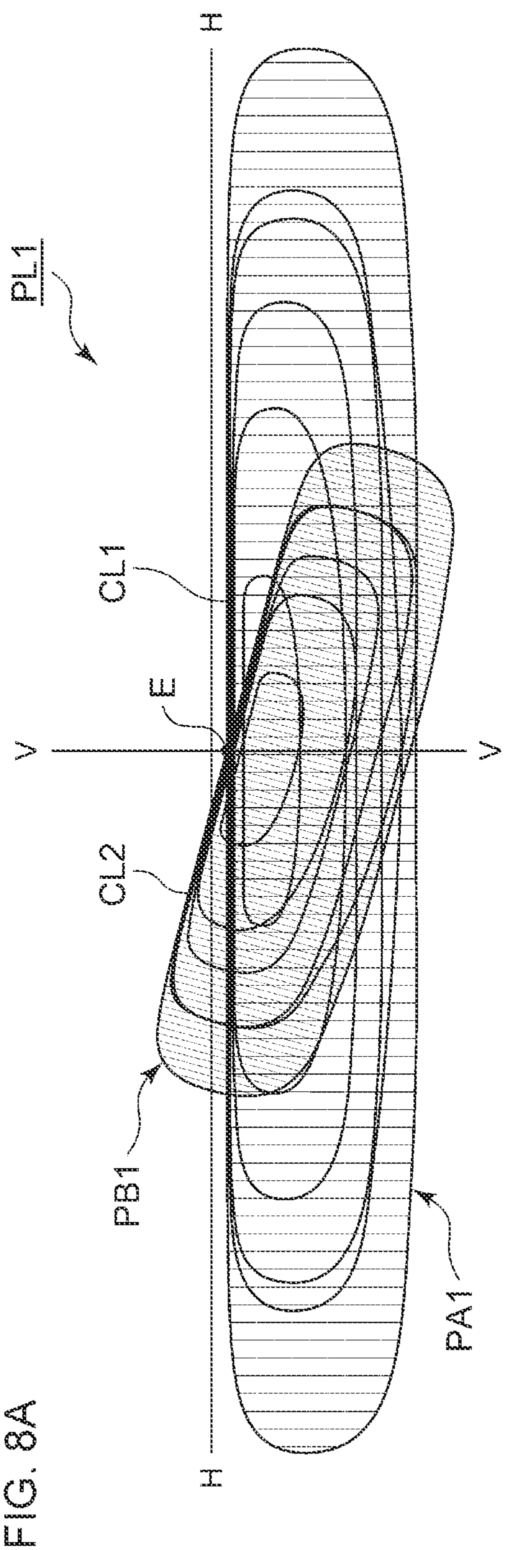
FIGS. 8A and 8B are diagrams showing a low-beam light distribution pattern and a high-beam light distribution pattern.
Figure 8B:
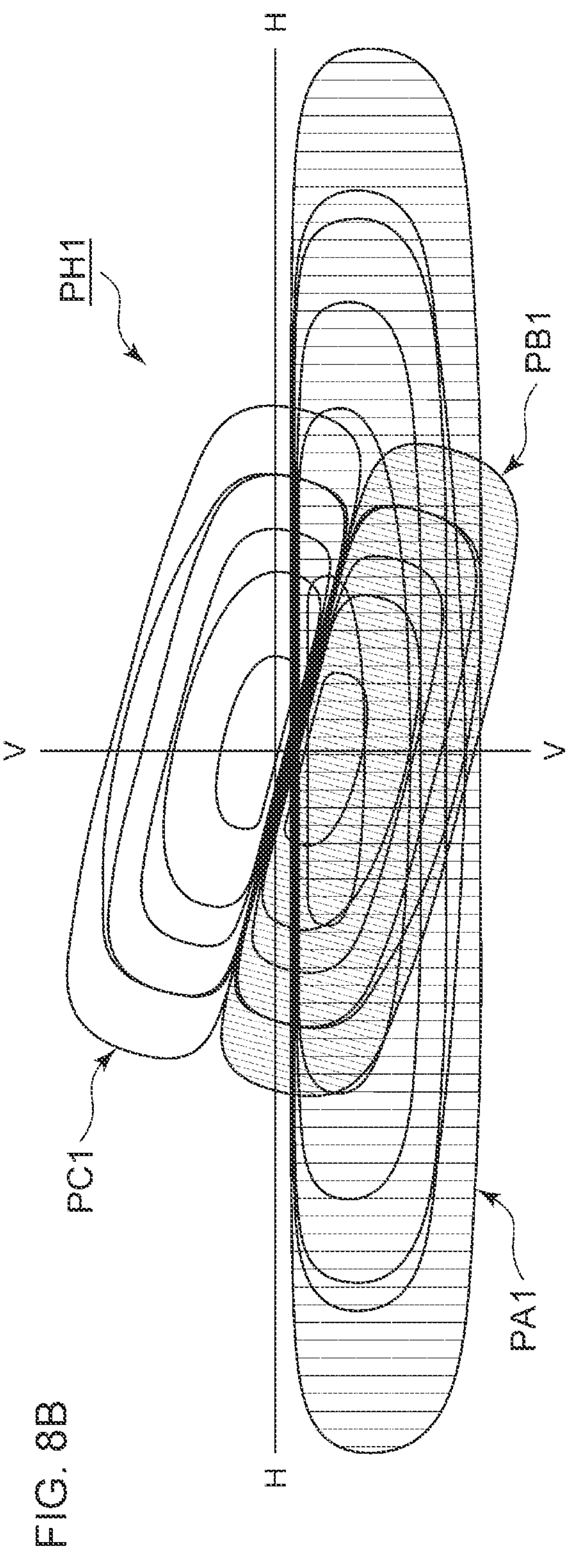

FIGS. 8A and 8B are perspective diagrams each showing a light distribution pattern formed on a virtual vertical screen arranged at a position 25 *m* in front of a vehicle by light emitted toward the front side of the lamp from the automotive lamp 10. FIG. 8A is a diagram showing a low-beam light distribution pattern PL1. FIG. 8B is a diagram showing a high-beam light distribution pattern PH1.

The low-beam light distribution pattern PL1 shown in FIG. 8A is a low-beam light distribution pattern for left-side light distribution. The low-beam light distribution pattern PL1 has a horizontal cutoff line CL1 and an oblique cutoff line CL2 at its upper edge. The cutoff lines CL1 and CL2 are formed as follows. That is to say, the cutoff line CL1 is formed such that it defines an opposite-lane-side portion on the right side of line V-V that extends in the vertical direction, and that passes through a vanishing point H-V positioned on the front side of the lamp. On the other hand, the cutoff line CL2 is formed such that it defines the own-lane-side portion on the left side of the line V-V. The elbow point E, which is an intersection of the cutoff lines CL1 and CL2, is positioned on the order of 0.5 to 0.6 degrees below the vanishing point H-V.

The low-beam light distribution pattern PL1 is formed as a combined light distribution pattern that is a combination of a light distribution pattern PA1 formed by the light emitted from the first lamp unit 20 and a light distribution pattern PB1 formed by the light emitted from the second lamp unit 40.

The light distribution pattern PA1 is an oblong light distribution pattern having a long width extending in the horizontal direction with line V-V as its center line. The light distribution pattern PA1 is configured such that its upper edge defines the horizontal cutoff line CL1 of the low-beam light distribution pattern PL1.

The low-beam light distribution pattern PL1 has a high light intensity region defined as a portion positioned on the lower-left side of the elbow point E where the high light intensity region of the light distribution pattern PA1 and the high light intensity region of the light distribution pattern PB1 overlap.

The light distribution pattern PB1 shown in FIG. 8A is a light distribution pattern having a long width that extends in an oblique direction inclined by 15 degrees clockwise with respect to the horizontal direction. The light distribution pattern PB1 is configured such that its upper edge defines the oblique cutoff line CL2 of the low-beam light distribution pattern PL1.

The high-beam light distribution pattern PH1 shown in FIG. 8B is formed by combining the low-beam light distribution pattern PL1 and a light distribution pattern PC1 as an additional light distribution pattern.

The light distribution pattern PC1 is a light distribution pattern formed by the light emitted from the third lamp unit 60. The light distribution pattern PC1 is an oblong light distribution pattern having a long width extending in an oblique direction inclined by 15 degrees clockwise with respect to the horizontal direction. The light distribution pattern PC1 is configured such that its lower edge extends along the oblique cutoff line CL2 of the low-beam light distribution pattern PL1.

With such an arrangement in which such a high-beam light distribution pattern PH1 is formed, this is capable of securing distant visibility of a lane in front of the vehicle.

FIGS. 9 through 11 are diagrams for explaining the steps for forming the light distribution pattern PA1.

Figure 9A:
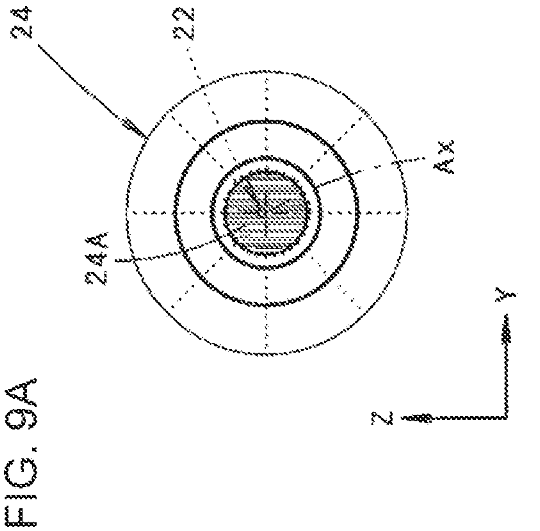
FIGS. 9A through 9C are diagrams for explaining a process for forming the light distribution pattern PA1 shown in FIG. 8A.
Figure 9B:
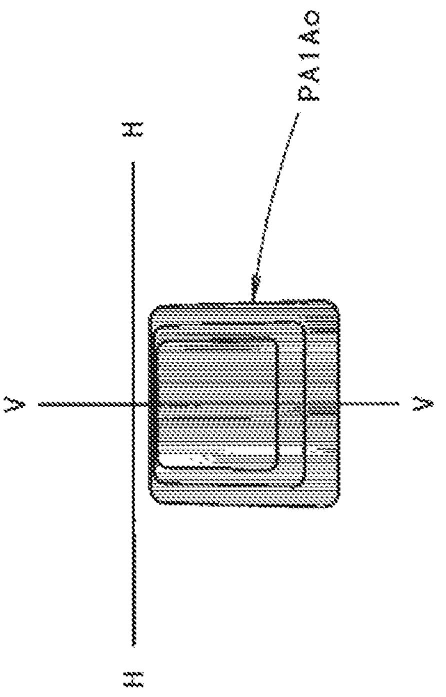
Figure 9C:
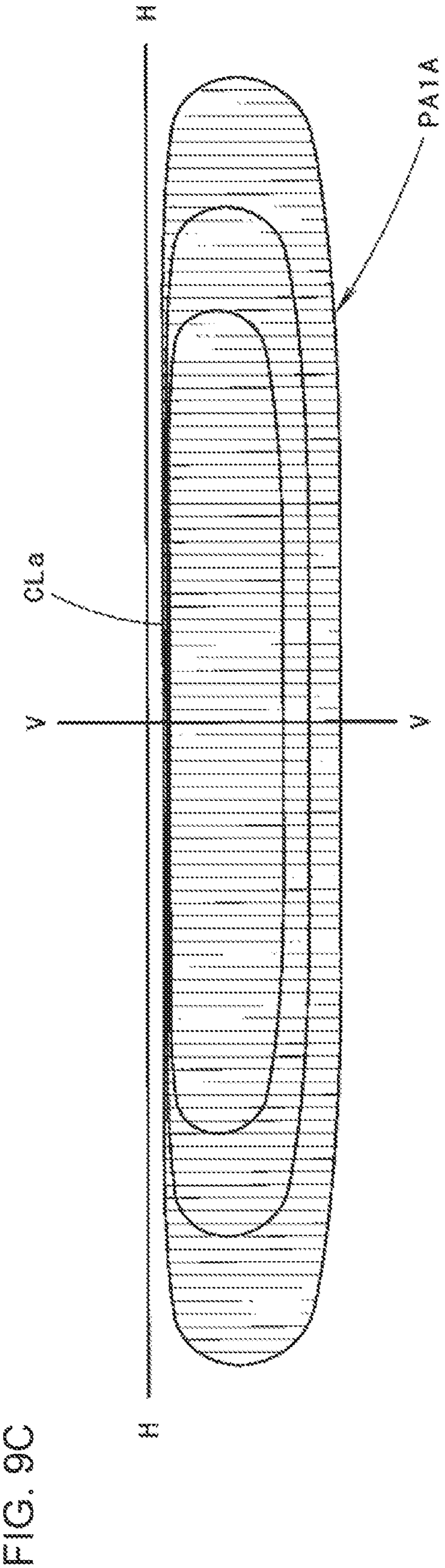

FIG. 9C is a diagram showing a light distribution pattern PA1A, which is a part of the light distribution pattern PA1, formed by the output light emitted from the direct light controller 64A.

The light distribution pattern PA1A is an oblong light distribution pattern having a large width formed by extending a light distribution pattern PA1Ao shown in FIG. 9B to both the left and right sides.

As shown in FIG. 9A, if the multiple horizontal diffusion lens elements 24*s*A through 24*s*C are not formed in the output face 24*a* of the translucent member 24, the light distribution pattern PA1Ao is a light distribution pattern formed by the output light from the direct light controller 24A.

The light distribution pattern PA1Ao is configured to have an approximately square outline shape below the line H-H that extends in the horizontal direction, and that passes through H-V. The light distribution pattern PA1Ao has an upper edge that defines a clear light/dark boundary line extending in the horizontal direction. This is due to the lower edge of a light-emitting face 22*a* of the light-emitting element 22 extending in the horizontal direction in the vicinity of the upper side of the axis Ax, and due to the direct light controller 24A of the translucent member 24 having the back face 24Ab configured such that the output light emitted from the center of light emission of the light-emitting element 22 is incident as parallel light passing through in a direction slightly inclined toward the lower side.

In actuality, the multiple horizontal diffusion lens elements 24*s*A through 24*s*C are formed in the output face 24*a* of the translucent member 24. Accordingly, the light distribution pattern PA1A formed by the output light from the direct light controller 24A is formed as an oblong light distribution pattern as shown in FIG. 9C. The light distribution pattern PA1A has an upper edge that defines the light/dark boundary line CLa extending in the horizontal direction.

It should be noted that the multiple lines drawn inside each of the light distribution patterns PA1Ao and PA1A indicate that the region enclosed by the inner line is relatively bright. The same can be said of other kinds of light distribution patterns.

FIG. 10 shows the light distribution patterns formed by the output light from the right-half region of the total reflection controller 24B in a case in which the multiple horizontal diffusion lens elements 24*s*A through 24*s*C are not formed in the output face 24*a* of the translucent member 24.

The light distribution pattern PA1B10 shown in FIG. 10B2 is a light distribution pattern formed by the reflected light from the reflection region R1 shown in FIG. 10A1. The light distribution pattern PA1B10 is formed as an approximately oblong light distribution pattern straddling the line V-V. The light distribution pattern PA1B10 has an upper region that is relatively bright with an upper edge that defines the light/dark boundary line extending in the approximately horizontal direction.

The light distribution pattern PA1B2*o* shown in FIG. 10B2 is a light distribution pattern formed by the reflected light from the reflection region R2 shown in FIG. 10A2. The light distribution pattern PA1B2*o* is formed as an approximately oblong light distribution pattern straddling the line V-V. The light distribution pattern PA1B2*o* has an upper region that is relatively bright with an upper edge that defines the light/dark boundary line extending in the approximately horizontal direction.

The light distribution pattern PA1B3*o* shown in FIG. 10B4 is a light distribution pattern formed by the reflected light from the reflection region R3 shown in FIG. 10A3. The light distribution pattern PA1B3*o* is formed as an approximately oblong light distribution pattern straddling the line V-V. The light distribution pattern PA1B3*o* has an upper region that is relatively bright with an upper edge that defines the light/dark boundary line extending in the approximately horizontal direction.

The light distribution pattern PA1B4*o* shown in FIG. 10B4 is a light distribution pattern formed by the reflected light from the reflection region R4 shown in FIG. 10A4. The light distribution pattern PA1B4*o* is formed as an approximately oblong light distribution pattern straddling the line V-V. The light distribution pattern PA1B4*o* has an upper region that is relatively bright with an upper edge that defines the light/dark boundary line extending in the approximately horizontal direction.

The reflection regions R1 through R4 are each designed to have a surface shape such that the light distribution patterns PA1B10 through PA1B4 each have an upper edge positioned at approximately the same height as that of the upper edge of the light distribution pattern PA1A shown in FIG. 9C.

Figure 11A:
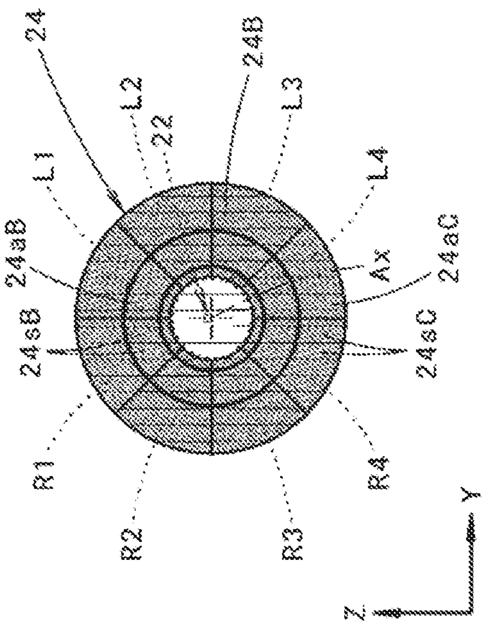
FIGS. 11A and 11B are diagrams for explaining a process for forming the light distribution pattern PA1 shown in FIG. 8A.
Figure 11B:
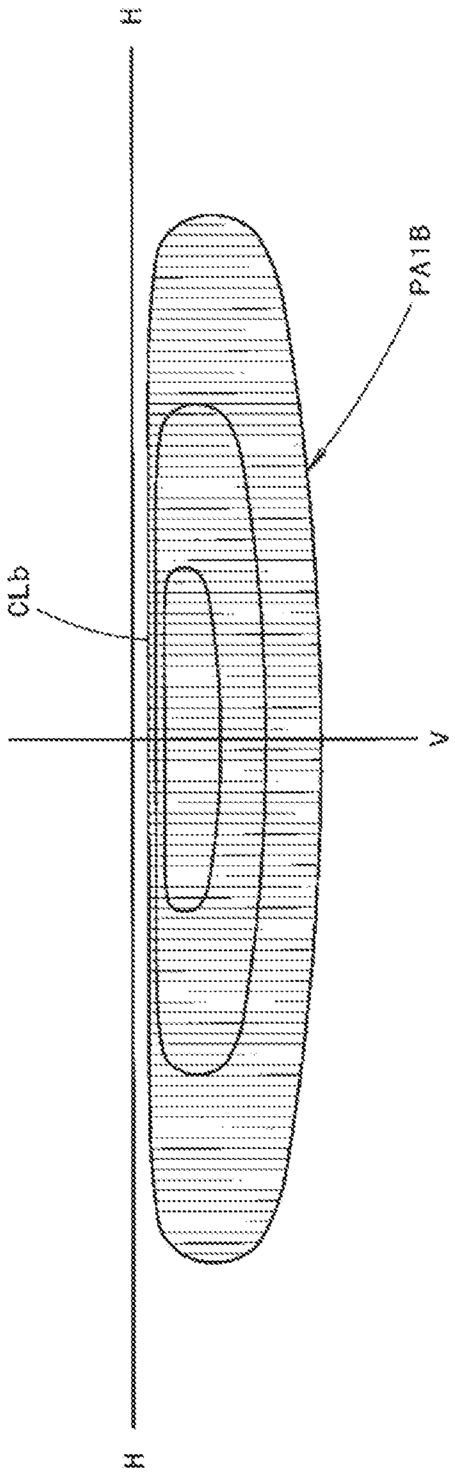

In actuality, as shown in FIG. 11A, the multiple horizontal diffusion lens elements 24*s*A through 24*s*C are formed in the output face 24*a* of the translucent member 24. Accordingly, as shown in FIG. 11B, the light distribution pattern PB1 formed by the output light from the entire region of the total reflection controller 24B is configured as an oblong light distribution pattern formed as a combination of the four light distribution patterns PA1B10 through PA1B4*o* shown in FIG. 10B1 through 10B4 and four light distribution patterns having a shape obtained by horizontally inverting the light distribution patterns PA1B10 through PA1B4*o*. The light distribution pattern PB1 has an upper edge that defines a relatively clear light/dark boundary line CLb.

With this, the light/dark boundary line CLa of the light distribution pattern PA1A and the light/dark boundary line CLb of the light distribution pattern PA1B are designed to define the horizontal cutoff line CL1 of the low-beam light distribution pattern PL1.

FIG. 12 is a diagram for explaining the steps for forming the light distribution pattern PB1 shown in FIG. 8A.

The light distribution pattern PB1 is configured as a combined light distribution pattern that is a combination of the light distribution pattern PB1A shown in FIG. 12B1 and the light distribution pattern PB1B shown in FIG. 12B2.

The light distribution pattern PB1A is a light distribution pattern formed by the output light from the direct light controller 44A of the translucent member 44 shown in FIG. 12A1. As shown in FIG. 12B1, the light distribution pattern PB1A is formed as an oblong light distribution pattern extending in an oblique direction as shown in FIG. 12B1 with an upper edge that defines a clear light/dark boundary line CLc extending in the oblique direction.

The light distribution pattern PB1B is a light distribution pattern formed by the output light from the total reflection controller 44B of the translucent member 44 shown in FIG. 12A2. As shown in FIG. 12B2, the light distribution pattern PB1B is formed as an oblong light distribution pattern extending in an oblique direction as shown in FIG. 12B2 with an upper edge that defines a light/dark boundary line CLd extending in the oblique direction.

With this, the light/dark boundary lines CLc and CLd are configured to define an oblique cutoff line CL2 of the low-beam light distribution pattern PL1.

The light distribution pattern PC1 is configured in the same manner as the light distribution pattern PB1 by the third lamp unit 60 having the same configuration as that of the second lamp unit 40. For example, the light distribution pattern PC1 may be a light distribution pattern obtained by rotating the light distribution pattern PB1 by 180 degrees with the elbow point as the center. In this case, the translucent member 64 of the third lamp unit 60 may have the same optical configuration as that of the translucent member 44 of the second lamp unit 40. Also, the translucent member 64 may be mounted rotated by 180 degrees with respect to the translucent member 44 as viewed in a front view.

Also, the light distribution pattern PC1 and the light distribution pattern PB1 may be designed to have a line symmetrical relation with respect to the oblique cutoff line CL2. In this case, the translucent member 64 of the third lamp unit 60 may have the same optical configuration as that of the translucent member 44 of the second lamp unit 40. Also, the translucent member 64 may be mounted inverted upside down with respect to the translucent member 44 as viewed in a front view.

Next, description will be made regarding the effects of the present embodiment.

The automotive lamp 10 according to the present embodiment includes the first lamp unit 20 and the second lamp unit 40. The translucent members 24 and 44 respectively include the direct light controllers 24A and 44A respectively configured to directly output the light from the light-emitting elements 22 and 42 incident to the translucent members 24 and 44, and the total reflection controllers 24B and 44B respectively configured to output the output light incident from the light-emitting elements 22 and 42 via the translucent members 24 and 44 after it is totally reflected. This allows a large part of the output light from the light-emitting elements 22 and 42 to be output toward the front side of the lamp, thereby providing improved utilization efficiency of the light flux emitted from the light source.

In this case, in the first lamp unit 20, the translucent member 24 includes the total reflection controller 24B having the total reflection face 24Bb2 formed of eight reflection regions L1, L2, L3, L4, R1, R2, R3, and R4 each configured as a sub-region of the total reflection face 24Bb2 divided in a circumferential direction. As a result, this is capable of easily aligning the upper-end positions of the light distribution patterns PA1B1*o*, PA1B2*o*, PA1B3*o*, PA1B4*o*, and so forth, formed by the reflected light from the reflection regions L1 through L4 and R1 through R4.

In the same manner, in the second lamp unit 40, the translucent member 44 includes the total reflection controller 44B having the same configuration as that of the translucent member 24 of the first lamp unit 20. Accordingly, this is capable of easily aligning the upper-end positions of the light distribution patterns formed by the reflected light from the respective reflection regions.

Furthermore, the multiple horizontal diffusion lens elements 24*s*A, 24*s*B, and 24*s*C are formed in the output face 24*a* of the translucent member 24 of the first lamp unit so as to diffuse the output light from the translucent member 24 in the horizontal direction. Moreover, the multiple oblique diffusion lens elements 44*s*A, 44*s*B, and 44*s*C are formed in the output face 44*a* of the translucent member 44 of the second lamp unit 40, so as to diffuse the output light from the translucent member 44 in an oblique direction inclined with respect to the horizontal direction. Accordingly, such an arrangement is capable of forming the low-beam light distribution pattern PL1 with its upper edge that defines the horizontal cutoff line CL1 and the oblique cutoff line CL2 formed by the light emitted from the first lamp unit 20 and the second lamp unit 40.

As described above, with the present embodiment in which the automotive lamp 10 includes the lamp unit configured to emit the output light from the light-emitting element toward the front of the lamp via the translucent member, this is capable of forming the bright low-beam light distribution pattern PL1 with its upper edge that defines the horizontal cutoff line CL1 and the oblique cutoff line CL2 with improved utilization efficiency of the light flux from the light source.

Furthermore, in the present embodiment, the translucent member 24 of the first lamp unit 20 is designed such that the horizontal diffusion lens element 24*s*A formed in the output region 24*a*A configured as an output face of the direct light controller 24A has a diffusion angle that is larger than those of the diffusion lens elements 24*s*B and 24*s*C formed in the output regions 24*a*B and 24*a*C each configured as an output face of the total reflection controller 24B. Moreover, the translucent member 44 of the second lamp unit 40 is designed such that the diffusion angle of the oblique diffusion lens element 44*s*A formed in the output region 44*a*A configured as an output face of the direct light controller 44A is larger than those of the oblique diffusion lens elements 44*s*B and 44*s*C formed in the output regions 44*a*B and 44*a*C each configured as an output face of the total reflection controller 44B. Accordingly, such an arrangement provides the following effects.

That is to say, the direct light controllers 24A and 44A are arranged at positions that are closer to the light-emitting elements 22 and 42 than the total reflection controllers 24B and 44B. Accordingly, the light distribution patterns PA1Ao and so forth formed by the output light from the direct light controllers 24A and 44A are larger than the light distribution patterns PA1B10 through PA1B4*o* and so forth formed by the output light from the total reflection controllers 24B and 44B.

With this, the horizontal diffusion lens element 24*s*A and the oblique diffusion lens element 44*s*A formed in the output regions 24*a*A and 44*a*A that form the output faces of the direct light controllers 24A and 44A are designed to have diffusion angles that are larger than the diffusion angles of the horizontal diffusion lens elements 24*s*B and 24*s*C formed in the output regions 24*a*B and 24*a*C that form the output faces of the total reflection controller 24B and the diffusion angles of the oblique diffusion lens elements 44*s*B and 44*s*C formed in the output regions 44*a*B and 44*a*C that form the output faces of the total reflection controller 44B. Such an arrangement is capable of forming the light distribution patterns PA1 and PB2 formed by the light emitted from the first lamp unit 20 and the second lamp unit 40 with little unevenness.

Moreover, in the present embodiment, the translucent member 24 of the first lamp unit 20 includes the total reflection controller 24B having an output face divided into the output region 24*a*B (inner circumferential ring-shaped region) and the output region 24*a*C (outer circumferential ring-shaped region). The horizontal diffusion lens element 24*s*B formed in the output region 24*a*B is designed to have a diffusion angle that is larger than that of the horizontal diffusion lens element 24*s*C formed in the output region 24*a*C. Moreover, the translucent member 44 of the second lamp unit 40 includes the total reflection controller 44B having an output region divided into the output region 44*a*B (inner circumferential ring-shaped region) and the output region 44*a*C (outer circumferential ring-shaped region). The oblique diffusion lens element 44*s*B formed in the output region 44*a*B is designed to have a diffusion angle that is larger than that of the oblique diffusion lens element 44*s*C formed in the output region 44*a*C. Accordingly, such an arrangement provides the following effects.

That is to say, the light distribution patterns formed by the output light from the output regions 24*a*B and 44*a*B are designed such that they are larger than those formed by the output light from the output regions 24*a*C and 44*a*C. Accordingly, with such an arrangement in which the horizontal diffusion lens element 24*s*B and the oblique diffusion lens element 44*s*B formed in the output regions 24*a*B and 44*a*B are designed to have diffusion angles that are larger than those of the horizontal diffusion lens element 24*s*C and the oblique diffusion lens element 44*s*C formed in the output regions 24*a*C and 44*a*C, this is capable of forming the light distribution patterns PA1 and PB1 by the light emitted from the first lamp unit 20 and the second lamp unit 40 with little unevenness.

In this case, the translucent members 24 and 44, which are respectively included in the first lamp unit 20 and the second lamp unit 40, respectively include the total reflection controllers 24B and 44B having the output regions 24*a*B and 44Ba configured as the output faces thereof arranged at positions shifted toward the front side of the lamp with respect to the output regions 24*a*A and 44*a*A that form the output faces of the direct light controllers 24A and 44A. Moreover, the output regions 24*a*C and 44*a*C that form the output faces of the total reflection controllers 24C and 44C are arranged at positions shifted toward the front side of the lamp with respect to the output regions 24*a*B and 44*a*B that form the output faces of the total reflection controllers 24B and 44B. This allows the translucent members 24 and 44 to be designed to have a reduced thickness.

Furthermore, the automotive lamp 10 according to the present embodiment is configured to additionally supply the light emitted from the third lamp unit 60 having approximately the same configuration as those of the first lamp unit 20 and the second lamp unit 40 so as to form the high-beam light distribution pattern PH1. Accordingly, this arrangement is capable of providing functions as a headlamp while ensuring design consistency.

The third lamp unit 60 has the same configuration as that of the second lamp unit 40. The light distribution pattern PC1 has the same features as those of the light distribution pattern PB1. This allows the light distribution pattern PC1 and the light distribution pattern PB1 to be arranged with their upper edges perfectly aligned. Also, this allows the light distribution patterns PC1 and PB1 to be arranged such that they slightly overlap. Accordingly, this allows a region where the light distribution pattern PC1 and the low-beam light distribution region PL1 are overlapped to be reduced. This allows the energy of the light distribution pattern PC1 to be concentrated to a distant range to be illuminated in the high-beam mode.

Figure 13:
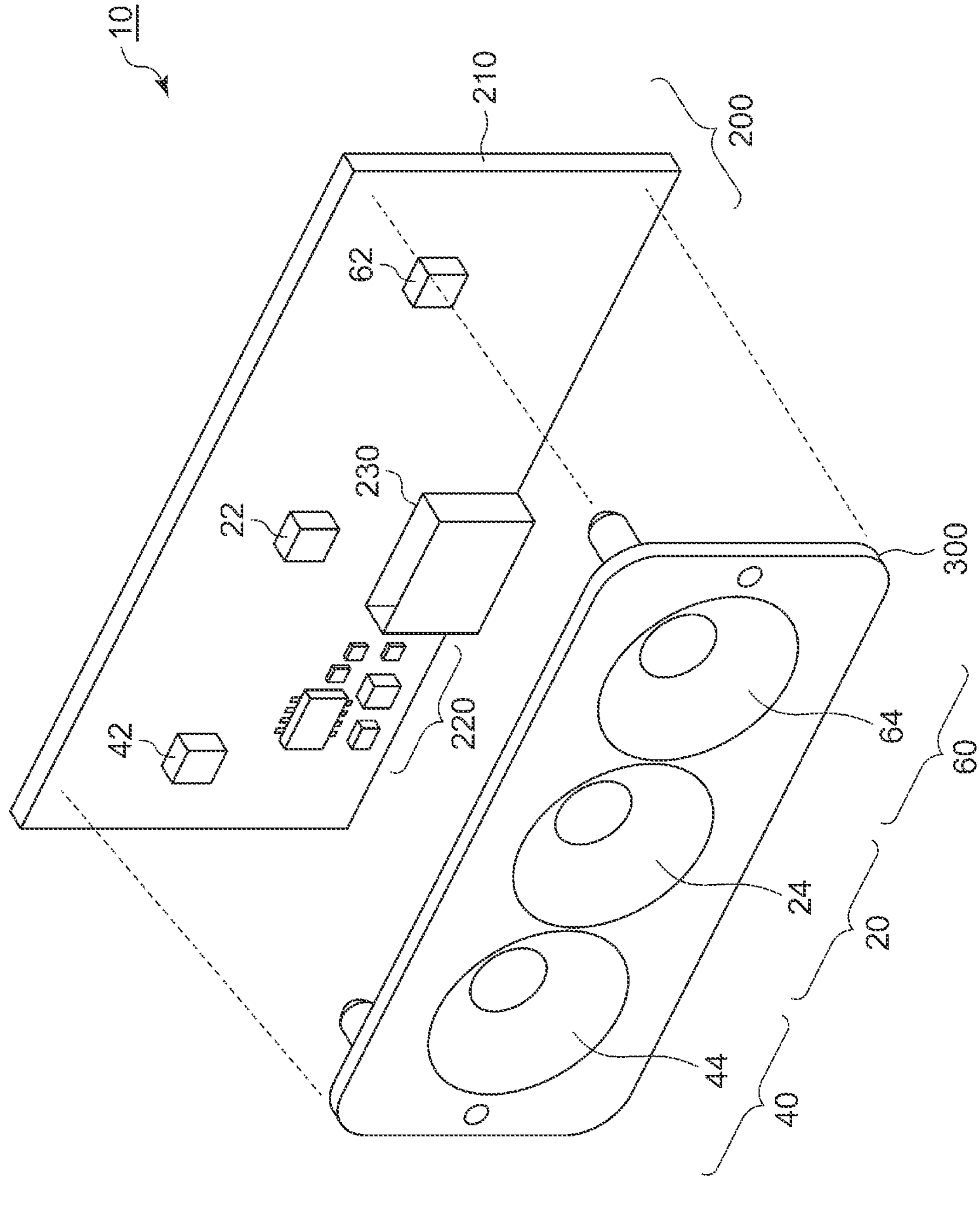
FIG. 13 is an exploded perspective diagram showing an example configuration of the automotive lamp.

FIG. 13 is an exploded perspective diagram showing an example configuration of the automotive lamp 10. The automotive lamp 10 includes an electrical unit 200 in which electrical circuits are modularized and an optical unit 300 in which an optical system is mounted. In this example, the first lamp unit 20 is arranged as a central lamp unit. Furthermore, the second lamp unit 40 is arranged on the central side of the vehicle, and the third lamp unit 60 is arranged on the outer side of the vehicle.

The electrical unit 200 is also referred to as an "LED assembly". The electrical unit 200 includes a substrate 210. The light-emitting elements 22, 42, and 62 respectively included in the first lamp unit 20, the second lamp unit 40, and the third lamp unit 60 are mounted on the common substrate 210 together with their lighting circuits 220 and connectors 230.

The optical systems of the first lamp unit 20, the second lamp unit 40, and the third lamp unit 60, i.e., the translucent members 24, 44, and 64, are mounted on the optical unit 300 such that they are detachably mounted on the electrical unit 200.

Figure 14A:
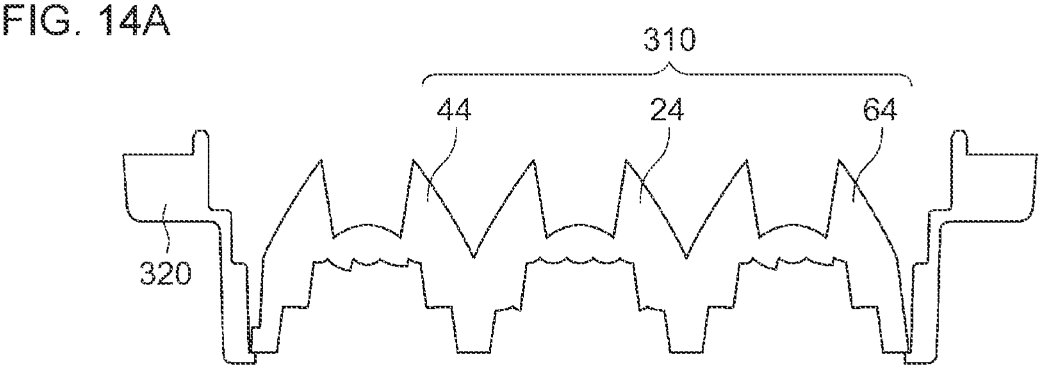
FIGS. 14A and 14B are a cross-sectional view and a front view each showing an optical system unit.
Figure 14B:
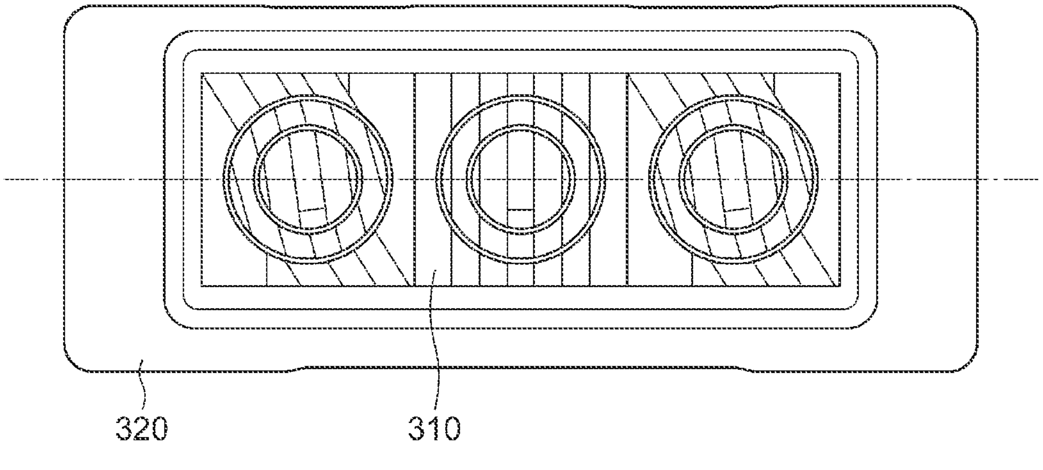

FIGS. 14A and 14B are a cross-sectional diagram and a front diagram each showing the optical unit 300. The optical unit 300 includes a lens unit 310 and a lens holder 320.

The lens unit 310 is configured including the translucent members 24, 44, and 64 monolithically formed using a transparent synthetic resin such as an acrylic resin or the like. The lens unit 310 is fixed to the lens holder 320. The lens holder 320 is fixed to the substrate 210 of the electrical unit 200.

Description has been made above regarding the embodiments. The above-described embodiments have been described for exemplary purposes only. Rather, it can be readily conceived by those skilled in this art that various modifications may be made by making various combinations of the aforementioned components or processes, which are also encompassed in the technical scope of the present invention. Description will be made below regarding such modifications.

Figure 15:
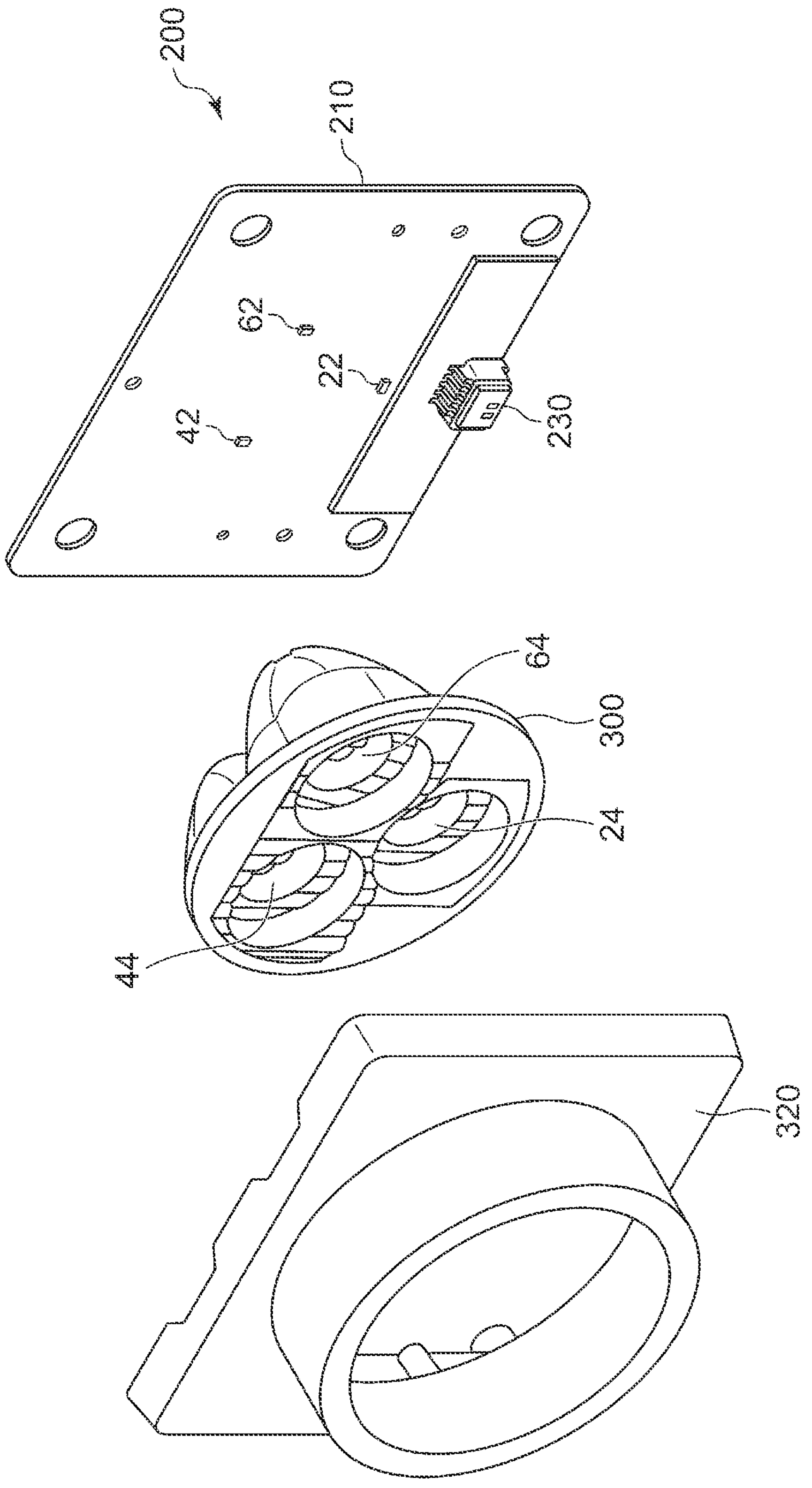
FIG. 15 is an exploded perspective diagram showing an example modification of the automotive lamp.

FIG. 15 is an exploded perspective diagram showing a modification of the automotive lamp 10. In this modification, the three lamp units 20, 40, and 60 are arranged in a non-linear manner. Specifically, the three lamp units 20, 40, and are arranged such that the centers thereof are positioned at vertices of a virtual triangle as viewed in a front view of the automotive lamp 10. For example, the translucent members 24, 44, and 46 may be arranged such that the outer circles thereof are circumscribed to each other. In this case, the light-emitting elements 22, 42, and 62 are arranged such that they define the vertices of an equilateral triangle on the substrate 210.

In this example, the first lamp unit 20 is arranged on the lower side, and the second lamp unit 40 and the third lamp unit 60 are arranged on the upper side. However, the positions thereof may be interchanged.

Figure 16C:
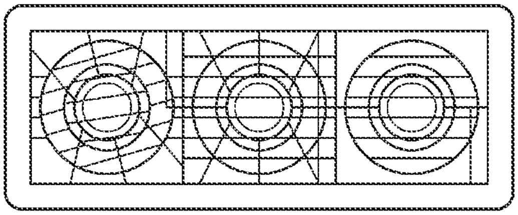
FIGS. 16A through 16C each show the automotive lamp according to a modification.
Figure 16B:
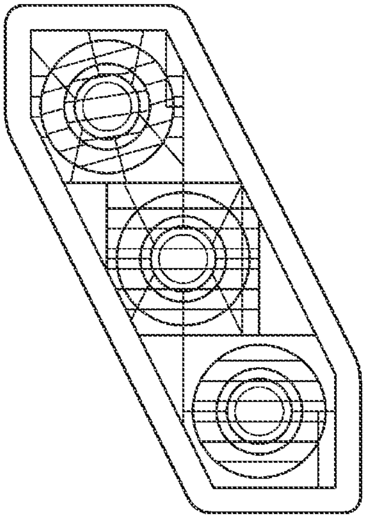
Figure 16A:
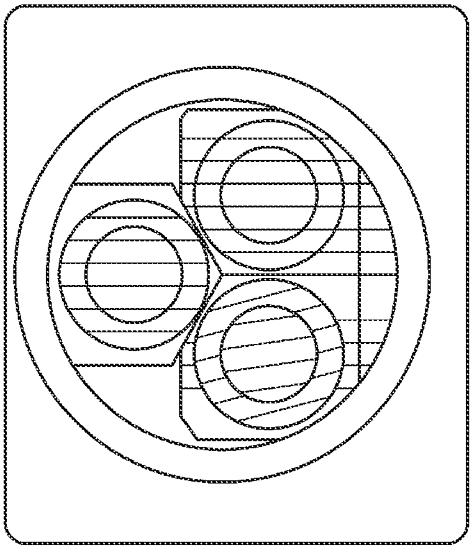

FIGS. 16A through 16C are diagrams each showing the automotive lamp 10 according to a modification. FIG. 16A shows an arrangement obtained by inverting the configuration shown in FIG. 15 upside down. Also, as shown in FIG. 16B, the first lamp unit 20, the second lamp 40, and the third lamp unit 60 may be arranged on a straight line extending in an oblique direction. Also, as shown in FIG. 16C, the first lamp unit 20, the second lamp 40, and the third lamp unit 60 may be arranged in the vertical direction.

Other Modifications

Description has been made in the embodiments regarding an arrangement in which the total reflection controller 24B of the translucent member 24 has the total reflection face 24Bb divided into eight reflection regions L1 through L4 and R1 through R4. Also, an arrangement may be made in which the total reflection face 24Bb is divided into nine or more regions or seven or less regions.

Description has been made in the embodiments regarding an arrangement in which the horizontal diffusion lens elements 24sA through 24sC, 44sA through 44sC, and 64sA through 64sC, are each configured as a convex cylindrical lens. Also, such horizontal diffusion lens elements may each be configured as a concave cylindrical lens.

Description has been made in the embodiments regarding an arrangement in which, in the translucent members 24, 44, and 64, the total reflection controllers 24B, 44B, and 64B respectively include the total reflection faces 24Bb, 44Bb, and 64Bb each configured as a rotationally curved face or a curved face defined with a rotationally curved face as a reference face. Also, each translucent member may be configured as a curved face that differs from the curved faces described above. Also, each translucent member may be configured as a combination of multiple planar faces.

Description has been made in the embodiments regarding an arrangement in which the translucent members 24, 44, and 64 respectively have the output faces 24*a*, 44*a*, and 64*a* divided into a concentric structure as viewed in a front view of the lamp. Also, each translucent member may be divided into a structure (e.g., elliptical, rectangular, etc.) that differs from such a concentric structure.

The present invention is not restricted to such an arrangement described in the embodiments and modifications thereof. Also, various modifications thereof may be made as an adoptable application.

What is claimed is:

1. An automotive lamp structured to be switchable between a low-beam mode and a high-beam mode, comprising:

- a first lamp unit structured to illuminate a first region having its longitudinal direction in a horizontal direction, and having its upper edge that defines a horizontal cutoff line in both the low-beam mode and the high-beam mode;
- a second lamp unit structured to illuminate a second region having its longitudinal direction in a direction inclined with respect to the horizontal direction, and having its upper edge that defines an oblique cutoff line in both the low-beam mode and the high-beam mode; and
- a third lamp unit structured to illuminate a third region having its longitudinal direction in a direction inclined with respect to the horizontal direction, and having its lower edge parallel to the oblique cutoff line in the high-beam mode.

2. The automotive lamp according to claim 1, wherein the lower edge of the third region is aligned with the oblique cutoff line or is positioned below the oblique cutoff line.

3. The automotive lamp according to claim 1, wherein the first region has a longitudinal length that is longer than those of the second region and the third region.

4. The automotive lamp according to claim 1, wherein at least one from among the first lamp unit and the second lamp unit provides a lower light intensity in the high beam mode than the light intensity thereof in the high-beam mode.

5. The automotive lamp according to claim 1, wherein the first lamp unit through the third lamp unit each have substantially the same optical configuration.

6. The automotive lamp according to claim 1, wherein the first lamp unit through the third lamp unit each comprise:

- a light-emitting element; and
- a translucent member structured to emit output light of the light-emitting element toward a front side of the lamp,
- wherein the translucent member comprises:
  - a direct light controller structured to directly output light from the light-emitting element toward the front side of the lamp after it is incident to the translucent member; and
  - a total reflection controller structured to output light toward the front side of the lamp after the light emitted from the light-emitting element and incident to the translucent member is totally reflected,
- wherein the total reflection controller has a total reflection face divided into a plurality of reflection regions defined in a circumferential portion of the direct light controller extending in a circumferential direction,
- and wherein a plurality of diffusion lens elements are formed in an output face of the translucent member so as to diffuse output light from the translucent member in a predetermined direction.

7. The automotive lamp according to claim 6, wherein the plurality of diffusion lens elements of the first lamp unit are arranged in a horizontal direction as viewed in a front view,

- and wherein the plurality of diffusion lens elements of the second lamp unit and the third lamp unit are arranged in an oblique direction as viewed in a front view.

8. The automotive lamp according to claim 6, wherein the translucent members of the first lamp unit, the second lamp unit, and the third lamp unit may be monolithically formed as a single unit.

9. The automotive lamp according to claim 6, wherein the light-emitting elements of the first lamp unit, the second lamp unit, and the third lamp unit and a lighting circuit thereof are mounted on the same substrate.

10. The automotive lamp according to claim 1, wherein the first lamp unit through the third lamp unit are arranged such that the centers thereof are positioned at vertices of a virtual triangle as viewed in a front view.

11. The automotive lamp according to claim 1, wherein the first lamp unit through the third lamp unit are arranged on the same straight line as viewed in a front view.

* * * * *